US012776902B2

(12) United States Patent
Schmidtler et al.

(10) Patent No.: US 12,776,902 B2
(45) Date of Patent: Oct. 27, 2026

(54) GENERATING A RELIABLE BIOMETRIC HASH

(71) Applicant: Trulioo Information Services Inc., Vancouver (CA)

(72) Inventors: Mauritius Alexander Schmidtler, Escondido, CA (US); Oz Hanoch Wilson, San Diego, CA (US); Hyder Al Asadi, El Cajon, CA (US); Chahm An, Poway, CA (US)

(73) Assignee: Trulioo Information Services Inc., Vancouver (CA)

( * ) Notice: Subject to any disclaimer, the term of this patent is extended or adjusted under 35 U.S.C. 154(b) by 0 days.

(21) Appl. No.: 18/608,903

(22) Filed: Mar. 18, 2024

(65) Prior Publication Data

US 2025/0293870 A1 Sep. 18, 2025

(51) Int. Cl.
*H04L 9/08* (2006.01)

(52) U.S. Cl.
CPC .................................. *H04L 9/0866* (2013.01)

(58) Field of Classification Search
CPC ..................................................... H04L 9/0866
See application file for complete search history.

(56) References Cited

U.S. PATENT DOCUMENTS

| | | | |
|---|---|---|---|
| 11,468,285 B1 | 10/2022 | Tang et al. | |
| 2007/0201726 A1 | 8/2007 | Steinberg et al. | |
| 2019/0213448 A1 | 7/2019 | Peng et al. | |
| 2020/0177942 A1* | 6/2020 | Wu | G06F 16/3347 |
| 2023/0081988 A1 | 3/2023 | Chung et al. | |
| 2023/0102702 A1* | 3/2023 | Shin | G06V 10/82 382/100 |
| 2023/0112458 A1* | 4/2023 | Wald | G06F 21/32 726/19 |
| 2023/0215219 A1* | 7/2023 | Lee | G06V 40/161 382/181 |
| 2025/0238911 A1* | 7/2025 | Takada | H04N 23/61 |

OTHER PUBLICATIONS

Dong, Zhen, et al. "Face video retrieval via deep learning of binary hash representations." Proceedings of the AAAI Conference on Artificial Intelligence. vol. 30. No. 1. 2016. (Year: 2016).*

M. Kan, D. Xu, S. Shan and X. Chen, "Semisupervised Hashing via Kernel Hyperplane Learning for Scalable Image Search," in IEEE Transactions on Circuits and Systems for Video Technology, vol. 24, No. 4, pp. 704-713, Apr. 2014 (Year: 2014).*

International Search Report and Written Opinion received for PCT Patent Application No. PCT/US2025/020468, mailed on Jul. 2, 2025, 13 pages.

* cited by examiner

*Primary Examiner* — Sangseok Park

(57) ABSTRACT

Systems and methods for generating reliable biometric hashes are provided. In some examples, a method includes receiving one or more input images and performing pre-processing on the one or more input images. In some examples, the pre-processing includes a face detection, landmark estimation, and liveness check. In some examples, the method further includes extracting one or more feature vectors from the one or more pre-processed images, via a machine-learning model, and generating a biometric hash, based on the one or more extracted feature vectors of the one or more pre-processed images.

20 Claims, 8 Drawing Sheets

100

GENERATING A RELIABLE BIOMETRIC HASH

BACKGROUND

Digital or electronic identity verification mechanisms may be used in a variety of contexts. In some examples, biometric hashes can be used as a form of digital electronic verification. A biometric hash is a pseudorandom representation (e.g., an integer or a sequence of bits) of biometric data, such as facial characteristics.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure relate to methods, systems, and media for generating a reliable biometric hash.

In some examples, a method for generating a reliable biometric hash includes receiving an input image and performing pre-processing on the input image. In some examples, the pre-processing includes performing a face detection, localization, landmark estimation, quality check, pose estimation, shot finding, liveness check, face alignment, and/or augmentation on the input image. In some examples, the method further includes extracting one or more feature vectors from the pre-processed image, via a machine-learning model, and generating a biometric hash, based on the one or more extracted feature vectors of the pre-processed image. In some examples, the biometric hash is generated using a novel mirror hash model and/or novel kernel hash model. In some examples, techniques provided herein for generating a reliable biometric hash provide advantages over conventional handling of biometric data because the techniques provide improved security and/or privacy of biometric data, among other benefits described later herein.

This Summary is provided to introduce a selection of concepts in a simplified form that are further described below in the Detailed Description. This summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTION OF THE DRAWINGS

Non-limiting and non-exhaustive examples are described with reference to the following Figures.

DETAILED DESCRIPTION

Figure 1:
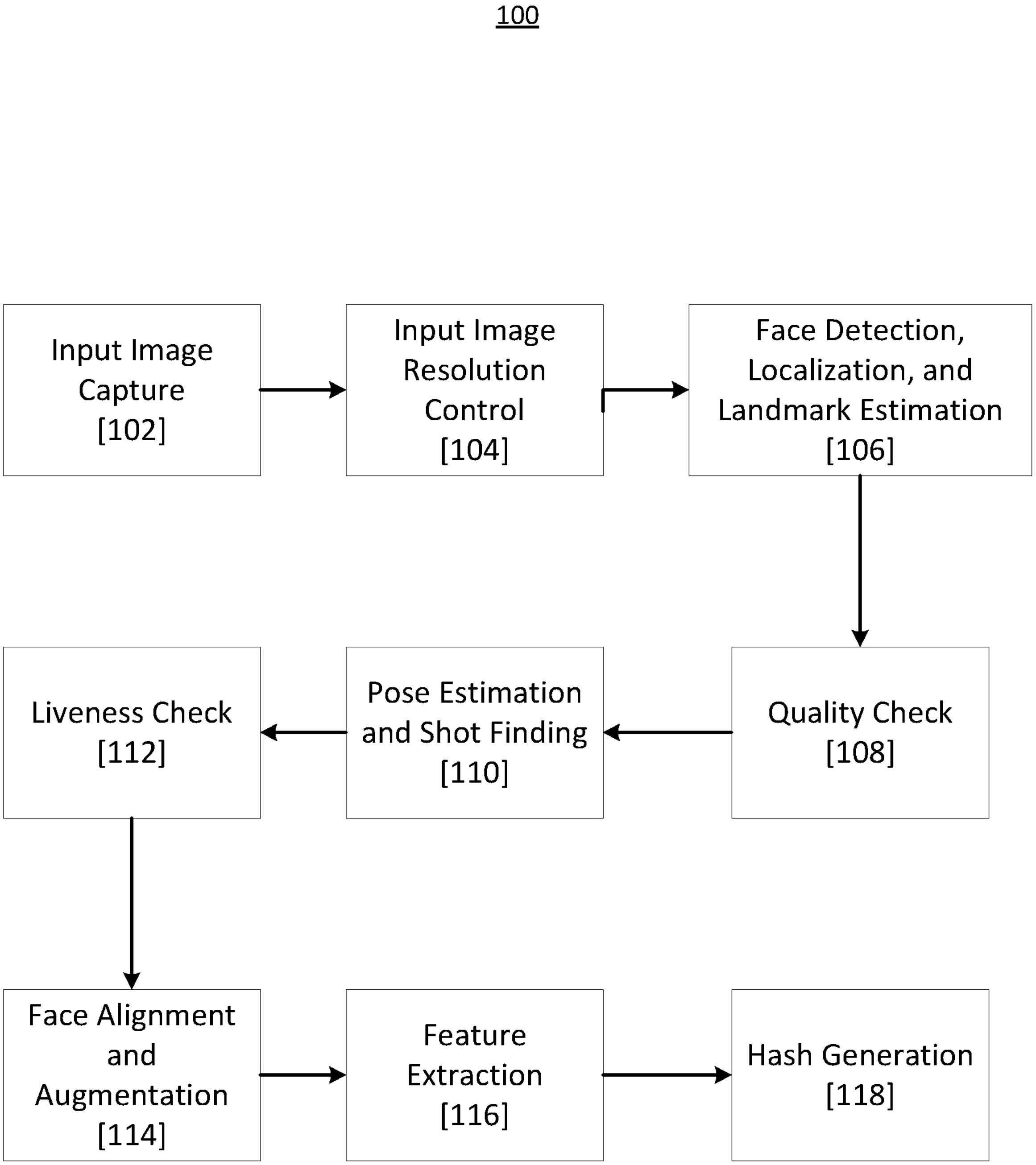
FIG. 1 illustrates an example flow of generating a biometric hash according to some aspects described herein.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

As mentioned above, digital or electronic identity verification mechanisms (e.g., methods, systems, and media) may be used in a variety of contexts. In some examples, biometric hashes can be used as a form of digital electronic verification. A biometric hash is a pseudorandom integer representation of biometric data, Such as facial characteristics.

In some examples, a biometric hash is unlinkable. For example, the biometric hash process may have the ability to generate various uncorrelated hashes from the same biometric data, allowing cancelability and renewability. In some examples, hashes do not reveal any information about the biometric data to which it corresponds. In some examples, a biometric hash is substantially irreversible. For example, it may be computationally difficult to recover original biometric data from the biometric hash. In some examples, a biometric hash is unique and/or repeatable. For example, biometric data of different people may generate different biometric hashes, while different instances of biometric data of the same person may generate the same biometric hash, for example given the same salt. In the context of cryptography and hashing algorithms, such as those discussed herein, a salt may be random data that is generated and added to input of a hash function. In some examples, a salt is used to ensure that the same input, when hashed multiple times, produces different hash values. In some examples, by using a unique salt for each user or each password, even if two users have the same password, their hashed values will be different due to the addition of the unique salt. In some examples, this addition of the salt makes it significantly more difficult and/or time-consuming for attackers to use precomputed tables or other techniques to reverse-engineer the passwords.

Conventional techniques for handling biometric data may face several challenges. For example, some challenges can include maintaining security (e.g., preventing data breaches and/or potential decryption of) of the biometric data, privacy concerns regarding face templates, privacy concerns regarding feature vectors storage, and/or compromised biometric data remediation (e.g., cancelability and/or renewability).

Additional and/or alternative challenges for handling biometric data may be recognized by those of ordinary skill in the art.

Mechanisms provided herein for generating biometric hashes have several benefits. For example, the biometric hashes improve security and/or privacy of biometric data handling over conventional techniques for generating biometric hashes. Further, in some examples, mechanisms provided herein enable the use of cryptographic operations on biometric data (e.g., hashing). Further, in some examples, mechanisms provided herein enable the use of biometric data as a seed for cryptographic operations (e.g., user-friendly public/private key applications). Additional and/or alternative benefits will be recognized by those of ordinary skill in the art.

Mechanisms provided herein can be used in a variety of use cases. For example, mechanisms provided herein can be used to enhance security and privacy. In some examples, using biometric hashes generated according mechanisms provided herein, instead of raw face templates and/or feature vectors, adds an extra layer of protection when it comes to security and privacy, such as due to the unlinkability and/or irreversibility properties of the biometric hash. In some examples, biometric hashes generated according to mechanisms provided herein can be used for face verification and/or face identification.

As another example, mechanisms provided herein can be used for authentication. In some examples, biometric hashes generated according to mechanisms provided herein may be used for authentication in a password-like authentication scheme (e.g., using biometric hashes instead of, and/or in addition to, cryptographically hashed passwords).

As another example, mechanisms provided herein can be used for key pair generation. In some examples, biometric hashes generated according to mechanisms provided herein may be used for a biometric hash as a seed to generate a public/private key pair, on demand (e.g., user-friendly, no need to store the private key), which can then be used for any public/private key pair application, for example public/private key pairs can be used to authenticate end users, via their faces. In some examples, public/private key pairs can be used to sign a digital certificate (e.g., creating a reusable identity, where a digital certificate is used to prove the identity of an end user or some aspects thereof, such as age, gender, address, etc.). While some examples of use cases have been provided herein, additional and/or alternative use cases of mechanisms provided herein will be recognized by those of ordinary skill in the art.

FIG. 1 illustrates an example flow 100 of generating a biometric hash according to some aspects described herein. The example flow 100 is merely an example. In some examples, the flow 100 may include additional, fewer, and/or alternative steps than those specifically illustrated and described herein. In some examples the flow 100 may be performed on computing devices, such as on a local computing device (e.g., computing device 202) or on a remote computing device (e.g., server 204). In some examples, the flow 100 may be performed across two or more computing devices, such as with one or more aspects of the flow 100 being performed across different computing devices than another one or more aspects of the flow 100.

In the context of generating biometric hashes, enrollment and inference are two stages in the process of creating and utilizing biometric data for identification or verification purposes. In some examples, enrollment is the initial process during which a person's biometric data, such as facial features, is captured and converted into a digital format. In some examples, the purpose of enrollment is to create a pseudorandom representation (also known as a biometric hash) from the captured data. In some examples, verification is the process of matching biometric data against a reference data to verify the identity of an individual. In some examples, such as a zero-knowledge proof application, the reference data may be a public key. In some examples, a reference data may be a database of previously enrolled biometric hashes. In some examples, identification is the process of using biometric data to identify an individual within a set of previously collected reference data. During verification or identification, new biometric data may be captured and processed in the same way as during enrollment. In some examples, the biometric data may be used to create a biometric hash using the same biometric hash process including the salt from enrollment.

In some examples, by managing input variables into the flow 100, mechanisms described herein can ensure that a process is operating within a controlled domain, thereby enhancing its reliability. In some examples, properties of a biometric hash (unlinkability, irreversibility, uniqueness, and repeatability) can be difficult to satisfy in a real-world application. Controlling the input data of a biometric hash pipeline during enrollment and inference (e.g., authentication, verification, and identification), as described herein, can be beneficial to ensure not only the reliability of the biometric hash, but also the security and/or integrity of a system using one or more aspects of the flow 100. Mechanisms provided herein, such as flow 100, apply a novel pipeline that increases the reliability of generating biometric hashes and the overall security and/or integrity of a system, as compared to conventional techniques.

In some examples, controlling the input data involves controlling one or more aspects of flow 100, such as processes 102-116 discussed in further detail below, to lead to a system that can generate a reliable biometric hash (e.g., controlling input image capture, input/face images resolution, face detection confidence score, face pose, quality factors such as illumination condition and blurriness, thus controlling input variances, and capturing of consistent and informative facial features). In some examples, controlling input data during inference techniques is beneficial for consistent matching performance, as well as reliable liveness detection, which can be beneficial for detecting and preventing spoofing attacks, thus maintaining the overall security/integrity of mechanisms provided herein. In some examples, maintaining security and/or integrity of mechanisms provided herein is beneficial for boosting trustworthiness of the mechanisms in real-world deployment, by building confidence among end users. In some examples, that built confidence among end users can promote wider adoption of mechanisms provided herein that maintain security and/or integrity for generating biometric hashes.

In some examples, live streaming of input images and/or active feedback occurs during one or more processes of the flow 100 (e.g., processes 102, 104, 106, 108, 110, 112). In some examples, the live streaming and/or active feedback can be interrupted by an end user or time out. In some examples, one or more of the processes of the flow 100 run after certain preceding processes are executed (e.g., all preceding processes, in examples where the illustrated processes of the flow 100 are performed sequentially), all requirements are met, and/or input images are captured. In some examples, the flow 100 can be used for static pre-captured input images. In some examples, a liveness detection can be performed on images that are being captured live (e.g., in real-time). In some examples, an alternative liveness detection can be performed on pre-captured input images (e.g., checking for pre-confirmed liveness, providing additional input from a user, etc.).

At process 102, the flow 100 includes receiving an image or image capture. In some examples, the image is input (e.g., by a user or device). In some examples, the image is obtained, such as by a device that is configured to extract the image from one or more memories of one or more computing devices. In some examples, controlling the input data during enrollment (e.g., enrollment in a use case involving biometric hashes) allows for the capture of one or more input images that accurately represent an individual being enrolled. In some examples, the input image is a selfie (e.g., an image of a user's face). In some examples, the input image is received from an image sensor, such as a camera. In some examples, the image sensor is part of, or otherwise in communication with, a computing device (e.g., a mobile front/rear camera, a webcam, etc.).

At process 104, the flow 100 controls input image resolution (e.g., of the image received from process 102). In some examples, process 104 includes ensuring that an input image resolution is higher than a threshold. In some examples, the threshold is a minimum resolution required by a downstream component, such as a machine-learning model, to achieve the desired performance of the component (e.g., extract informative facial features at process 116).

In some examples, process 104 includes decreasing the resolution of an input image (e.g., downscaling the input image), if the resolution of the input image is higher than the threshold, such as to avoid unnecessary processing downstream in the flow 100. For example, having a resolution that is too high (e.g., higher than the threshold) can negatively impact smoothness of the input image and/or processes of the flow 100 (e.g., the face detection, localization, and/or landmark estimation at process 106). Therefore, the process 104 can help to ensure that an input image is of high-enough resolution, while also reducing resolution, in some instances, to improve computational efficiency of the flow 100.

In some examples, process 104 includes determining that a resolution of the input image is too low. In such examples, process 104 may include providing an indication of the low resolution. For example, the indication may be an audio indication and/or a visual indication. In some examples, the indication may be provided to a user, such that, if the input image is being received via a live capture, the user can take corrective action to improve the resolution of the image. In some examples, the indication may be provided to inform a user and/or system that the resolution is too low.

At process 106, the flow 100 includes face detection, localization, and/or landmark estimation. In some examples, process 106 uses one or more machine-learning models to detect the presence of a user's face, localize the user's face within a frame, and/or estimate landmarks on the user's face. In some examples, the detection, localization, and/or estimating are all performed by one machine-learning model. For example, the machine-learning model may detect the presence of the user's face with respect to a detection confidence score and a threshold (e.g., the threshold may be a minimum threshold or a maximum threshold, such that in some examples, the user's face must be below the threshold to be detected, or in some examples, the user's face must be above the threshold to be detected). In some examples, the detection, localization, and/or estimating are performed by one or more separate machine-learning models.

In some examples, the machine-learning model may check that no more than one face exists in the input image during enrollment. In some examples, if the machine-learning models detects that more than one face exists in the input image, then mechanisms provided herein may generate an indication of too many faces (e.g., more than one face) being in the input image, Such that corrective action may be taken (e.g., adjust a camera or environment, such that only one face is in the input image). Accordingly, in some examples, feedback is passed to an end user to warn them in case no face is detected or more than one face exists in a frame for an image.

In some examples, the face detection of process 106 acts as a quality check. For example, partially obscure faces, and/or faces that are not quite visible due to low illumination, may not have high detection confidence scores, even if they pass the detection confidence score threshold. In some examples, feedback (e.g., a visual and/or audio indication) is passed to the end user to warn them that it is not possible to clearly capture their face.

In some examples, process 106 includes performing localization. For example, methods provided herein may localize a user's face in the input image by estimating a bounding geometry. For example, the bounding geometry may be a box, or a circle, or a triangle, or another shape recognized by those of ordinary skill in the art. In some examples, the bounding geometry may be displayed (e.g., see FIGS. 3A-3D) to give feedback to the user regarding the mandatory face area boundaries for the flow 100. In some examples, process 106 may make sure that the end user's whole face is within the frame. In some examples, the process 106 may make sure that the user's face is close/big enough, such that face resolution is sufficient for downstream processes (e.g., processes of flow 100). In some examples, feedback (e.g., an audio and/or visual indication) may be provided to the end user to ask them to get closer to a camera and/or include their whole face within the frame for an image. In some examples, the feedback may include recommendations for improving image quality, such as taking off an accessory, which may be obstructing the user's face, (e.g., sunglasses, hat, face-covering, etc.), adjusting brightness in the user's environment, holding a camera more still, and/or other recommendations that may be recognized by those of ordinary skill in the art.

In some examples, process 106 includes estimating the location of face landmarks (e.g., eyes, cars, nose, and mouth), to be used by downstream processes (e.g., pose estimation and face alignment). In some examples, there may be three face landmarks. In some examples, there may be four face landmarks. Additional and/or alternative numbers and/or types of face landmarks should be recognized by those of ordinary skill in the art.

At process 108, the flow includes performing a quality check. In some examples, the process 108 uses deterministic methods to measure quality attributes of the input images and/or detected face. For example, the process 108 can include measuring blurriness and/or sharpness of an image, such as using a Laplacian kernel. A Laplacian kernel is a second-order derivative operator that can highlight rapid changes in pixel intensity, such as may be associated with edges in an image. In some examples, high Laplacian variance indicates pronounced edges, meaning high sharpness and low blurriness, and vice versa.

In some examples, high blurriness can be a result of motion and/or low-light conditions. In some examples, entropy can be used to detect low-light images. Entropy captures the diversity of pixel intensities in an image. In low-light conditions, images typically have reduced contrast and narrower range of pixel intensities, therefore having less randomness and a lower entropy. In some examples, feedback is provided to a user to warn them that it is not possible to clearly capture their face, such as due to high blurriness and/or low-light conditions. In some examples, the feedback may include recommendations for improving image quality, such as adjusting brightness (e.g., increasing/decreasing an amount of light) in the user's environment, holding a camera more still, and/or other recommendations that may be recognized by those of ordinary skill in the art.

At process 110, the flow includes performing pose estimation and/or shot finding. In some examples, pose estimation and/or shot finding can be used as feedback to guide a user to a target pose, such as to capture a target shot. In some examples, estimating actual degrees for pitch, yaw, and/or roll of a user in an image are not necessary. In some examples, performing pose estimation and/or shot finding is designed to have a controllable degree of tolerance to reduce friction during enrollment and inference, while still being able to capture consistent images for target poses. For example, a user may be guided to look straight at a camera, turn their head left/right to a predefined degree, and/or tilt their head up/down to a predefined degree.

In some examples, pose estimation is performed in real-time using face landmarks (e.g., determined from process 106). In some examples, pose estimation is performed using the same model (e.g., machine-learning model) as one or more aspects of process 106, thereby eliminating the need for an additional model. In some examples, pose estimation is performed using its own model specifically trained to estimate poses of a user based on a received image.

Figure 3A:
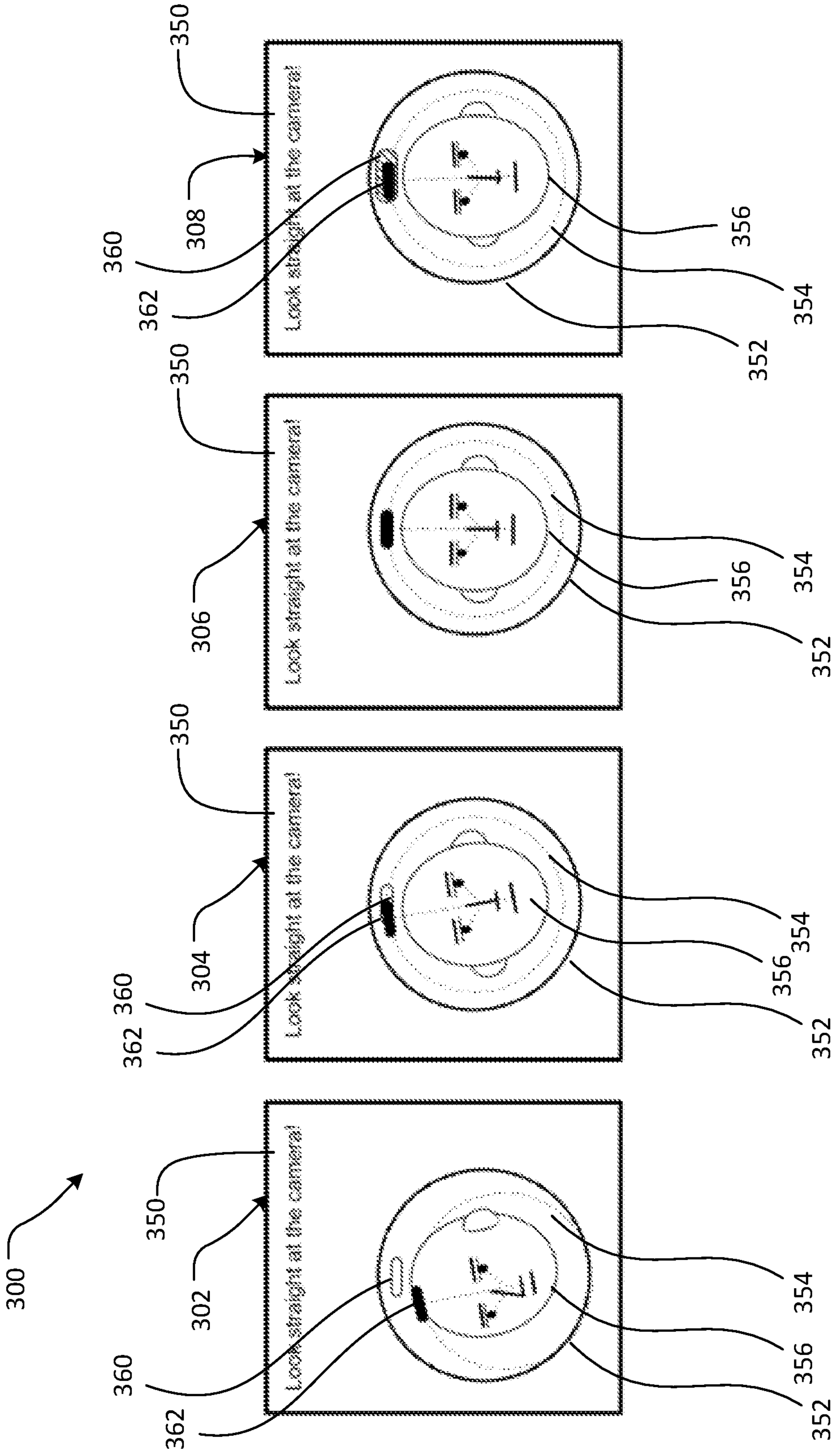
FIG. 3A illustrates an example user-interface, for generating a biometric hash, showing feedback and user guidance according to some aspects described herein.

In some examples, a first step of pose estimation is estimating the center of a user's face using one or more face landmarks, for example the circumcenter of eyes and the center of a mouth, as illustrated in FIG. 3A. Based on the selected landmarks, the estimated face center may be offset by a percentage of the bounding shape size (e.g., the size of the circle illustrated in FIG. 3A), so that the estimated face center and the bounding shape center are aligned when an end user is looking straight at the camera (e.g., pitch and yaw=0). From this point on, a vertical shift between the two centers may be an estimation of pitch, and a horizontal shift may be an estimation of yaw. In some examples, a second step is estimating roll using two face landmarks (e.g., eye landmarks), which are expected to be horizontally aligned. In some examples, the two face landmarks can be calculated using basic geometry (e.g., calculating a vertical shift between two landmarks in degrees).

In some examples, the bounding shape and the estimated face center can be used by a shot finder to give feedback to the user regarding their current pose and guide them to a target pose. In some examples, the guiding of a user can be achieved in a variety of ways, such as using audio and/or visual indications. For example FIG. 3A illustrates a technique used to capture a straight shot, where a first or hollow shape for a target pose is placed on the top of the bounding shape and offset by a percentage of the bounding shape size, while a second or filled shape for a current pose is placed on a virtual shape centered at the estimated face center, and scaled to a radius equal to the distance between the center of the bounding shape and the hollow shape, then rotated using the estimated roll, thus rotating the filled shape. In some examples, a prompt or call to action is provided to the user (e.g., via displayed text, displayed icons, emitted audio, etc.). In some examples, a tolerance for hitting the exact target pose can also be controlled. For example, the right-most sketch of FIG. 3A illustrates one example of adjusting tolerance by increasing the size of the hollow shape. Additional and/or alternative ways to increase the tolerance should be recognized by those of ordinary skill in the art.

Figure 3B:
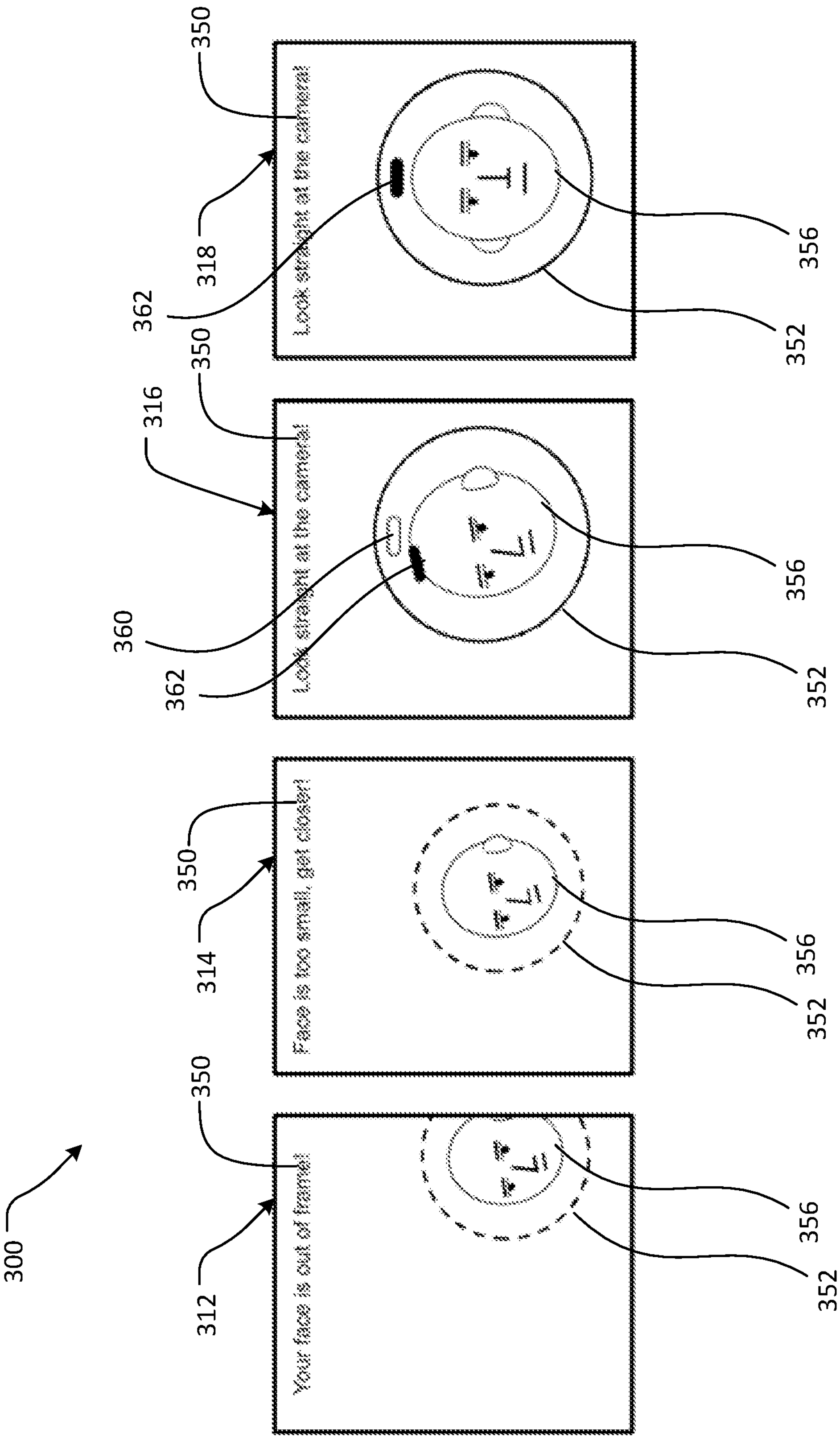
FIG. 3B illustrates an example user-interface, for generating a biometric hash, showing feedback and user guidance according to some aspects described herein.

In some examples, a user interface, such as is shown in FIGS. 3A-3D may be used to give feedback to a user regarding their current pose and/or a target pose. For example, FIG. 3B illustrates the capture of a straight shot starting with an out-of-frame face, then a faraway face where face resolution is too low. In some examples, feedback can be given using different bounding shape colors, line styles, text formats, icons, and/or other indications that may be recognized by those of ordinary skill in the art. Similar techniques can be used to give feedback to the user when the detected face confidence score is too low, a quality check is triggered, more than one face is detected in frame, and/or no face is detected in the frame.

Figure 3C:
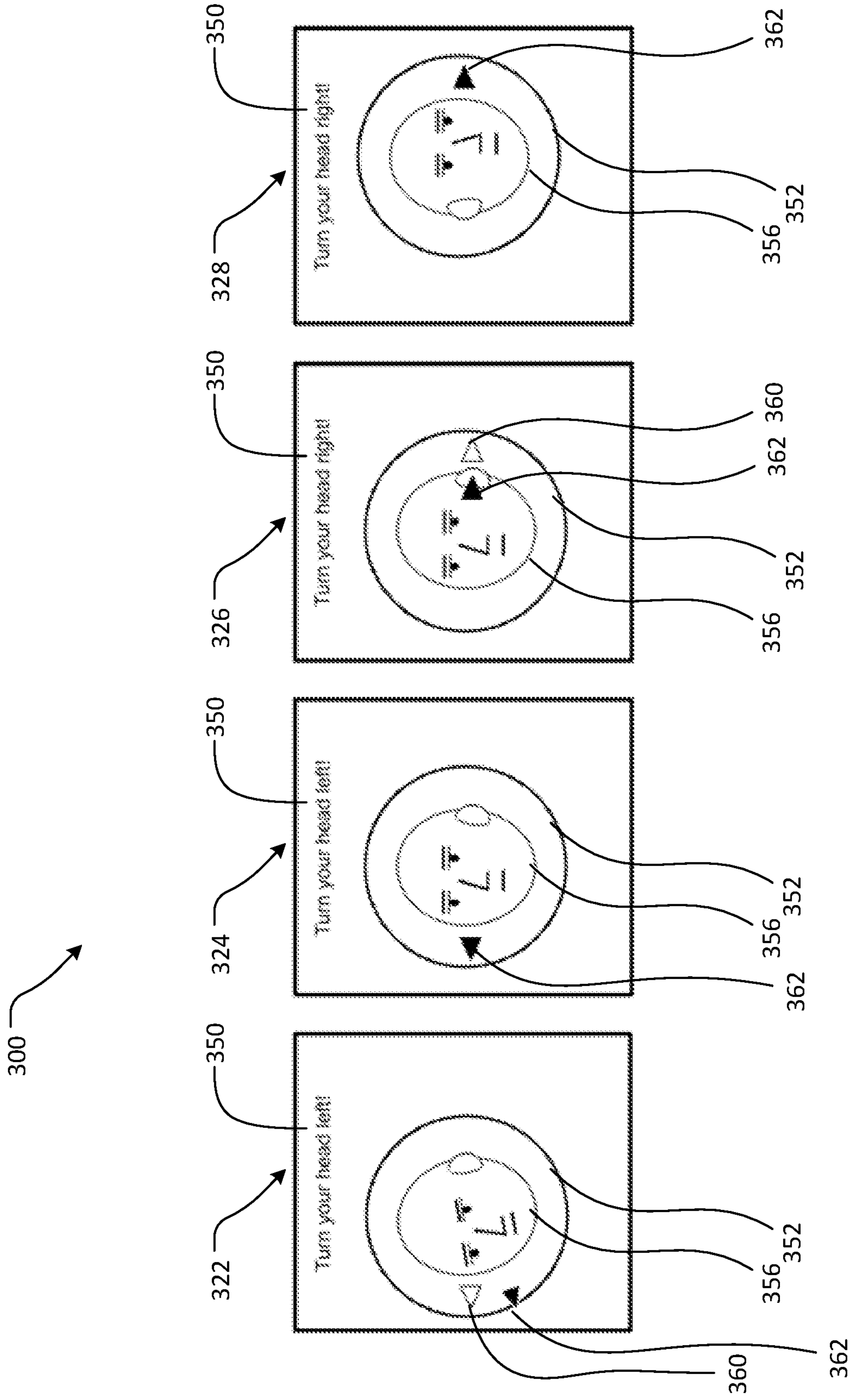
FIG. 3C illustrates an example user-interface, for generating a biometric hash, showing feedback and user guidance according to some aspects described herein.
Figure 3D:
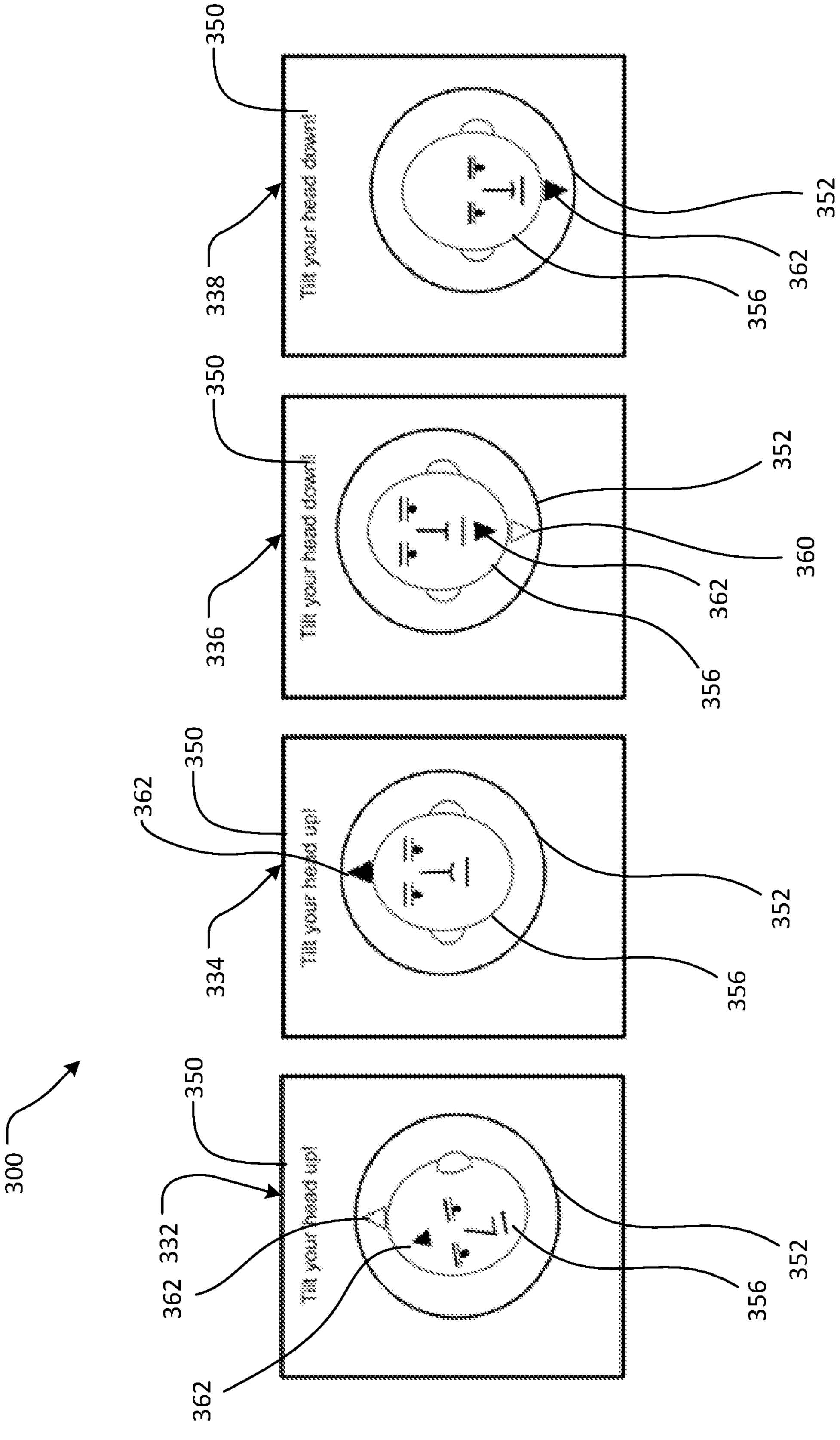
FIG. 3D illustrates an example user-interface, for generating a biometric hash, showing feedback and user guidance according to some aspects described herein.

In some examples, techniques provided herein to capture a straight shot image may be repeated to capture several straight shot images (e.g., with some level of variance), and/or may be used to capture other target shots. FIG. 3C illustrates capturing left and right shots, and FIG. 3D illustrates capturing up and down shots. In some examples, to capture a left shot, the hollow shape for target pose is placed on the left side of the bounding shape, such as in the same way the filled shape for a current pose is placed on the left side of the virtual shape, but this time the center of the virtual shape is offset to the right by a predefined percentage of the bounding shape size, so that the end user needs to turn left (e.g., by a predefined degree of yaw or close to it, while keeping a pitch of zero or close to it) to align the center of the virtual shape with the center of the bounding shape, thereby aligning the virtual and bounding shapes. Furthermore, the end user needs to align their face horizontally (e.g., to a roll of zero or close to it), so that the filled shape overlays the hollow shape, thereby achieving the target pose. Similar technique can be used to capture any pose, by using a different combination of virtual shape offsetting, hollow shape positioning, and/or filled shape positioning.

At process 112, a liveness check is performed. In some examples, the liveness check includes determining if a real/live face is being presented in the input images (e.g., of process 102) and/or face image(s). In some examples, the liveness check is beneficial for detecting and preventing spoofing attacks, thus maintaining the overall security/integrity of the flow 100. For example, malicious actors may attempt to use forged and/or manipulated facial data (e.g., printed photos, displayed photos/videos, masks and digital impersonations) during authentication, verification, or identification process, which could be detected by the liveness check at process 112. In some examples, liveness detection mechanisms can be classified into several categories based on the level of friction they impose. For example, a passive liveness detection may run in the background of the flow 100, as no action would be required from the end user. In some examples, the end user is not even alerted that liveness detection is being conducted, therefore passive liveness detection is frictionless (e.g., detecting natural face texture variations and monitoring natural behaviors like eye movement patterns and blinking).

In some examples, an active liveness detection may be implemented in which an action is required from the end user. Therefore, in some examples, active liveness detection may add a significant amount of friction. In some examples, a motion liveness detection mechanism can reuse pose estimation and shot finding processes to track the movement of a user's face in three-dimensional space (e.g., without the need to add another model), where a target movement (e.g., turning the face to a predefined degree to the left then to the right within a specific time frame) is presented as a challenge to the end user. In some examples, two aspects are examined during motion liveness detection: a smoothness of user movement (e.g., no still images are being used to pass liveness detection), and identity of images (e.g., the same face used to pass liveness detection is used to generate a biometric hash). In some examples, the latter aspect can be achieved using the same 1: N machine learning classifier that is used as a feature extractor during a hashing process (e.g., hashing processes provided herein, such as process 116, without the need to add another model).

In some examples, an enhanced passive liveness detection may be implemented in which no action is required from an end user side. In some examples, the end user may be alerted that liveness detection is being conducted and that some kind of input (e.g., flashing a specific pattern on the screen and checking its reflection on an end user's face) is needed. Therefore, enhanced passive liveness detection may add trivial friction (e.g., more friction than passive liveness detection, but less friction than active liveness detection). In some examples, multiple liveness detection techniques can be combined or layered in a failover scenario based on the desired level of security and tolerance to friction of a specific use case.

In some examples, the liveness detection includes prompting a user to turn a specific direction (e.g., left, right, up, and/or down) and detecting that the user complies with the prompt. In some examples, the liveness detection includes prompting a user to strike a specific pose (e.g., holding up a hand, raising an eyebrow, winking, smiling, etc.) and detecting that the user complies with the prompt. In some examples, if spoofing/hacking is detected, the flow 100 may be stopped. In some examples, if spoofing/hacking is detected, a notification of potential spoofing/hacking may be provided, such as via an audio and/or visual indication. In some examples, if spoofing/hacking is detected, the instance can be collected as an input for a fraud detection model, such as to assist in preventing potential future fraudulent activity.

At process 114, face alignment and/or face augmentation may be performed. In some examples, process 114 uses face landmarks (e.g., eye coordinates, nose location, cheek bones, etc.) to horizontally align face images and achieve a 0 degree roll (e.g., offsetting roll variance generated from pose tolerance in shot finding process). For example, a line drawn between a user's eyes may be leveled (e.g., with respect to a bottom of the frame) to align a user's face in an input image. In some examples, process 114 performs augmentation (e.g., via mirroring and/or rotation of the input image) to generate controlled variance for face image(s) during enrollment processes provided herein. In some examples, augmentation can include applying a model that improves quality of an image, lighting, or other effects to control variance for face image(s). In some examples, augmentation can include using a generative model to apply effects that would be difficult or impossible to achieve during enrollment (e.g., adding or removing glasses, mask, and facial hair, or applying age and/or smile effects).

At process 116, feature extraction may be performed. The feature extraction may be performed using a machine-learning model, such as a deep-learning model. In some examples, mechanisms provided herein use a 1: N machine learning classifier to generate feature vector(s) from aligned (and/or augmented) face image(s). In some examples, the model used for feature extraction may be trained to map facial images into a multidimensional space where the distances between points (e.g., representing face images) correspond to the dissimilarity between the faces. In some examples, the feature extraction model learns a mapping function directly from raw or scaled (e.g., normalized, standardized, etc.) pixel values to a compact and continuous feature space.

In some examples, the feature extraction model may be trained using a triplet loss function, where, given an anchor image, a positive image (an image of the same person), and a negative image (an image of a different person), the model is trained to minimize the distance between the anchor and positive images while maximizing the distance between the anchor and negative images. This enforces the model to map similar faces closer together in the feature space and dissimilar faces further apart. In some examples, the feature extraction model may be trained using a classification-based loss function with a margin, to ensure that the learned features are not just separable, but discriminative as well.

At process 118, a hash may be generated. The generated hash may be a biometric hash. Further, the biometric hash may be generated based on the features extracted from process 116 from aligned and/or augmented face image(s) from process 114. In some examples, the hash generation includes generating hyperplanes and/or selecting hyperplanes from a precalculated set of hyperplanes to be used in a locality sensitive hashing (LSH)-based approach. Some types of hashing techniques used in accordance with mechanisms provided herein include entropy hashing, mirror hashing, and kernel hashing.

Generally, protecting privacy in face recognition applications is important to ensure that biometric data is not exposed. In some examples, protecting biometric data may be a legal and/or ethical responsibility. In some examples, mechanisms provided herein boost trustworthiness of generating biometric hashes in real-world deployments, therefore building trust and acceptance among individuals and communities, as well as promoting wider adoption of biometric hashes.

Some examples provided herein for generating biometric hashes enhance a 1:N face recognition model performance by utilizing the availability of multiple enrollment images (e.g., input image captures from process 102). Moreover, some examples provided herein use enrollee-specific information captured during enrollment to learn a set of boundaries in multiple directions in the feature space (e.g., features extracted from process 116) tailored for a particular enrollee. In some examples, hashing models provided herein use an input pool of feature vectors, extracted from face images of a large sample of N subjects (input dataset), such as from the feature extraction of process 116.

In some examples, inputs and parameters to hash generation models include a size n of the training set and the quality of the input pool. In some examples, a large and diverse input pool sample is beneficial to achieve high hash accuracy. In some examples, inputs and parameters to hash generation models include a size n of a training set. In some examples, the training set is a subset of the input pool. In some examples, decreasing the size n of the training set increases true positive rate/false positive rate and decreases privacy, and vice versa for increasing the size of the training set. In some examples, inputs and parameters to hash generation models include a number m of trained models/hyperplanes/bits. In some examples, the number of trained models/hyperplanes/bits is a trade-off between true positive rate/false positive rate and system/hardware requirements. In some examples, decreasing the number of trained models/hyperplanes/bits increases true positive rate/false positive rate and decreases system/hardware requirements, and vice versa for increasing the number of trained models/hyperplanes/bits.

In some examples, the hash generation of process 118 includes an entropy hash model. In some examples, the entropy hash model tries to achieve maximum entropy in a system, such as to maximize security and privacy. In some examples, the entropy hash model selects a random subset of subjects from an input pool. In some examples, the bigger the subset group (training set size), the better the security and privacy of the system are, which as a result can affect a true positive rate/false positive rate. In some examples, the entropy hash model simplifies the random subset of subjects from the input pool into a binary classification problem. In some examples, the entropy hash model identifies the target subject (e.g., enrollee) and assigns them a random label. In some examples, the entropy hash model splits all of the subjects' labels randomly, for learning the classifier, into two groups (e.g., equal groups): the target subject's labels and non-target subject's labels, thus maximizing entropy in a system.

In some examples, the entropy hash model trains a number of classifiers k based on different random labels and different random subsets of subjects. In some examples, classifiers can be linear (e.g., a linear support vector machine in its primal form protects against data leakage) or nonlinear. In some examples, randomness may be added to the data by projecting to a higher dimension, which can ensure more security and privacy, and as a result, give a different true positive rate/false positive rate. In some examples, on inference, the entropy hash models receive a target subject as input and predict on which side of a hyperplane it exists, for each of the k classifiers, and get a hash of length k. In some examples, the entropy hash model can increase variance by adding more samples of each subject to the input pool N (and to the training set n) for a different true positive rate/false positive rate (e.g., at the cost of a disk footprint). In some examples, the enrollment feature vector(s) are discarded (e.g., removed from any/all memory storages) and/or the input feature vectors are discarded (e.g., removed from any/all memory storages of the enrollment device) after the biometric hash is generated.

In some examples, the hash generation of process 118 includes a mirror hash model. In some examples, the mirror hash model simplifies a process of hyperplane generation, such as by utilizing a high number of easy-to-find hyperplanes tailored to an enrollee. In some examples, the mirror hash model is beneficial over conventional hash generation models because it requires low time/space complexity and achieves high accuracy. In some examples, the mirror hash model has techniques for enrollment and/or inference.

On enrollment, the mirror hash model may use the feature extractor (e.g., of process 116) to extract feature vectors from aligned (and/or augmented) enrollment image(s), and consolidate (e.g., average) enrollment feature vectors, if there are more than one, to get one enrollment feature vector. The mirror hash model may randomly generate a hash of length k (e.g., 2048 bits), which can be considered as a hyperparameter. The mirror hash model may randomly choose (without replacement) m*k input feature vectors, where m is a multiplier that provides some margin (e.g., m=1.25). The mirror hash model may filter out one or more (e.g., any) input feature vectors that have a high cosine similarity with the enrollment feature vector. This process aims to prevent the generation of an unstable hyperplane/bit based on an input feature vector that collides with the enrollment feature vector.

For each input feature vector, mechanisms provided herein may analytically find the mirroring hyperplane between the enrollment and the input feature vector (e.g., split them with equal margin), where the enrollment feature vector is on the positive side of the hyperplane. In some examples, this finding can be achieved by finding a vector that starts from the middle point between the enrollment feature vector and the input feature vector and ends at the enrollment feature vector. In some examples, mechanisms provided herein can normalize (e.g., L2 normalize) the enrollment and/or input feature vector, such as before finding the mirroring hyperplane, to force it to go through the origin (e.g., such that the hyperplane has no bias, and splits the feature space in half). In some examples, as bias=0, mechanisms provided herein can randomly scale or normalize the hyperplanes to hide the location of the enrollment and input feature vectors without affecting classification accuracy.

In some examples, mechanisms provided herein can conduct entropy tests on a hyperplane level. In some examples, mechanisms provided herein can drop highly skewed hyperplanes, such as because they may compromise privacy. In some examples, mechanisms provided herein can generate more hyperplanes if a number of filtered hyperplanes that passed a hyperplane-level entropy test is less than k. In some examples, mechanisms provided herein can conduct an entropy test on a hash level, such as to verify that the overall entropy of a generated hash is sufficient. In some examples, mechanisms provided herein can generate more hyperplanes if a hash-level entropy threshold is not achieved. In some examples, mechanisms provided herein can match hyperplanes to a generated hash by multiplying 0-bit hyperplanes by −1. In some examples, the enrollment feature vector(s) are discarded (e.g., removed from any/all memory storages) and/or the input feature vectors are discarded (e.g., removed from any/all memory storages of the enrollment device) after the biometric hash is generated.

On inference, mechanisms provided herein, such as the mirror hash model, can use the feature extractor to extract feature vectors from aligned (and/or augmented) challenge image(s), and consolidate (e.g., average) challenge feature vectors, if there are more than one, to get one challenge feature vector. In some examples, mechanisms provided herein can dot product the challenge feature vector and the hyperplanes generated during enrollment, such as to turn positive scores to 1-bits and negative scores to 0-bits, to generate a biometric hash corresponding to the challenge feature vector.

In some examples, the hash generation of process 118 includes a kernel hash model. In some examples, given a large sample of N feature vectors (input pool) the kernel hash model can determine a pairwise distance matrix (e.g., kernel matrix) between pairs of feature vectors in the sample. In some examples, the kernel used herein is a gaussian kernel function (or RBF). In some examples, a scale of a gamma parameter of the gaussian kernel is estimated by a variance of the sample. In some examples, based on the derived kernel matrix a heuristic can be employed to determine subsets on the given input sample of N feature vectors.

In some examples, the heuristic to determine a training subset includes randomly drawing a sample from the given input pool and assigning it a positive label. In some examples, given the kernel matrix, mechanisms provided herein can find a sample that is farthest from the chosen sample in a kernel space and assign it a negative label. In some examples, given the selected positive and respective selected negative sample, mechanisms provided herein can randomly find (n−2)/2 samples that are close to the initial positive sample and (n−2)/2 samples that are close to the initial negative sample using a previously determined kernel matrix.

In some examples, the selected subset of n-samples can be used to train a support vector machine (SVM). In some examples, the SVM model parameters represent a hyperplane in a kernel space and are stored (e.g., in memory of a computing device). In some examples, the process of randomly selecting subsets, training a SVM, and storing the model parameters is repeated m times. In some examples, the step of determining the m models is a preprocessing step, and may only need to be executed once. In some examples, the input feature vectors are discarded (e.g., removed from any/all memory storages) after the support vector machine models are trained.

In some examples, given the m precalculated models, a k-bit biometric hash for a given feature vector f may be determined by: determine the m classification scores of the feature vector f, and finding the k models that returned the highest absolute classification score for the feature vector f. In some examples, the k-scores with a hash value of one are assigned to scores greater than zero and a hash value of zero is assigned to scores less than zero. In some examples, the hashing process provides an option to record if a score was greater than a given threshold or less than a given threshold. This option, if included in certain examples, allows for ignoring specific uncertain bits in further processing. In some examples, the enrollment feature vector(s) are discarded (e.g., removed from any/all memory storages) after the biometric hash is generated.

In some examples, the heuristic used in the kernel hash algorithm finds hyperplanes that subdivide the input space well, with respect to an observed distribution of samples in the input pool, thereby resulting in stable hashes. In some examples, to increase privacy, techniques provided herein can be modified by replacing the infinite-dimensional kernel space of the gaussian kernel with a finite-dimensional feature map that approximates the infinite-dimensional kernel space by using, for example, a finite-dimensional feature map based on a truncated orthonormal basis (ONB).

In some examples, post processing techniques may be applied to the generated hash of process 118. For example, bit grouping may be applied to the generated hash. As a post-processing mechanism, removing unstable bits from a hash and keeping only the stable ones may improve its repeatability. In some examples, testing the stability of individual bits on enrollment may lead to overfitting the enrollment image(s). In some examples, bit grouping enhances the stability of the overall hash by consolidating bit stability rather than trying to filter out unstable bits.

In some examples, bit grouping includes transforming a hash of k bits to k/g groups of similar value bits, such as based on an assumption that the hash is more likely to have a false negative (false rejection) due to few unmatched bits than to have a true negative (true rejection) due to few unmatched bits (e.g., false rejection occurs due to few unmatched bits while true rejection occurs due to many unmatched bits). For example, let g=3, where g is the group size, and let k=3072, where k is the length of the original hash—on enrollment, mechanisms provided herein may randomly group 1-bits in groups of size g and do the same for 0-bits, keeping bit indices and group IDs as part of the model parameters. In some examples, the number of 0/1-bits may be a multiplier of g, which means the final stable hash can have 1024 groups/bits, on inference, such that generated 3072 bits can be grouped using bit indices and group IDs. Further, in some examples, the value of each group can be averaged to get its stable bit value (e.g., 1024 stable groups/bits). This way having one unstable bit per group may not have any effect on the repeatability of the final stable hash, and may instead only be affected if more than one unstable bit happened to be in the same group. In some examples, bit grouping reduces the original hash length, trading off security/privacy for a shorter, more stable hash. In some examples, if model parameters (e.g., hyperplanes and bit grouping data) are compromised, then bit groups may help to estimate the location of enrollment feature vectors in a feature space.

In some examples, hashing models provided herein fit face templates/feature vectors to transformed templates consisting of bits randomly generated for every enrollment (e.g., the resulting biometric hash is randomly generated for each enrollment, such that it is unlinkable and irreversible). In some examples, the process of generating hyperplanes used for hashing has built-in randomization measures. Further, in some examples, the generated hyperplanes can be verified to have high entropy on hyperplane levels and/or hash levels.

As for the hyperplane-level entropy test, in some examples, the input feature vectors are used to conduct the test (e.g., the dot product score distribution of a hyperplane and input feature vectors). In some examples, one or more hyperplanes (e.g., outlier or highly skewed hyperplanes) are dropped, to improve privacy.

In some examples, the hash-level entropy test uses the hyperplane-level entropy test scores (e.g., the distribution of hyperplane-level entropy test score averages) to verify that an overall entropy of hyperplanes is sufficient. In some examples, hyperplane skewness is inherited from the feature extractor non-uniform feature space distribution. In some examples, the hash-level entropy test preserves security and privacy, by making sure that there is no correlation, or no high correlation, between the hyperplane direction of skewness and the location of the enrollment feature vector (e.g., the value of the associated bit).

While one component (e.g., biometric hash, model parameters, and/or input pool) has no or minimal information about the biometric data, combining two or more may have enough information to significantly impact the security and/or privacy. Therefore, besides separating the storage of different components, mechanisms provided herein provide various techniques to prevent/minimize the effect of combining two or more components. In some examples, the biometric hash should be salted and hashed then stored, used as a seed (e.g., never stored), or discarded after performing a face match (e.g., face verification of two input images).

In some examples, the hyperplanes (and/or other model parameters), are stored in a secure or encrypted storage (when applicable). In some examples, clustering hyperplanes and using cluster centroids as hyperplanes, leads to more discriminative hyperplanes and adds randomness which makes tracing back the input feature vectors used to generate a specific centroid relatively more difficult.

In some examples, transformation of a feature space to a proper dimensional space is included as an additional step, such as to further improve the security and privacy of the models. For example, Random Fourier Features (RFF) and/or Absolute Value Equations Transform (AVET) may be used for such transformations.

In some examples, the input pool is stored in a secure or encrypted storage (when applicable). In some examples, the input feature vectors may be used during enrollment, and then discarded, to enhance security and privacy. In some examples, a relatively large input pool already has a level of randomness that can be enhanced using one or more techniques provided herein. For instance, some examples include generating a hyperplane using one random input feature vector sampled from a large input pool (N choose 1). Some examples include generating a hyperplane using n random input feature vectors (N choose n), which generates a more discriminative hyperplane. Some examples include adding random noise to input feature vector(s) before generating a hyperplane. Some examples include generating a hyperplane using synthetic input feature vector(s), which theoretically extends the input pool size to infinity, therefore enhancing security and privacy.

In some examples, input feature vectors can be synthesized. For example, input feature vectors can be synthesized by adding noise to enrollment feature vectors to get input feature vectors that are θ degrees away, or m Euclidean distance away (θ and m are sampled from inter-class angle/distance distribution of the feature extractor). In some examples, input feature vectors can be synthesized by generating them using a generative neural network model (e.g., GAN). In some examples, input feature vectors can be synthesized by sampling them from a probability distribution (e.g., Gaussian Mixture Models).

Figure 2:
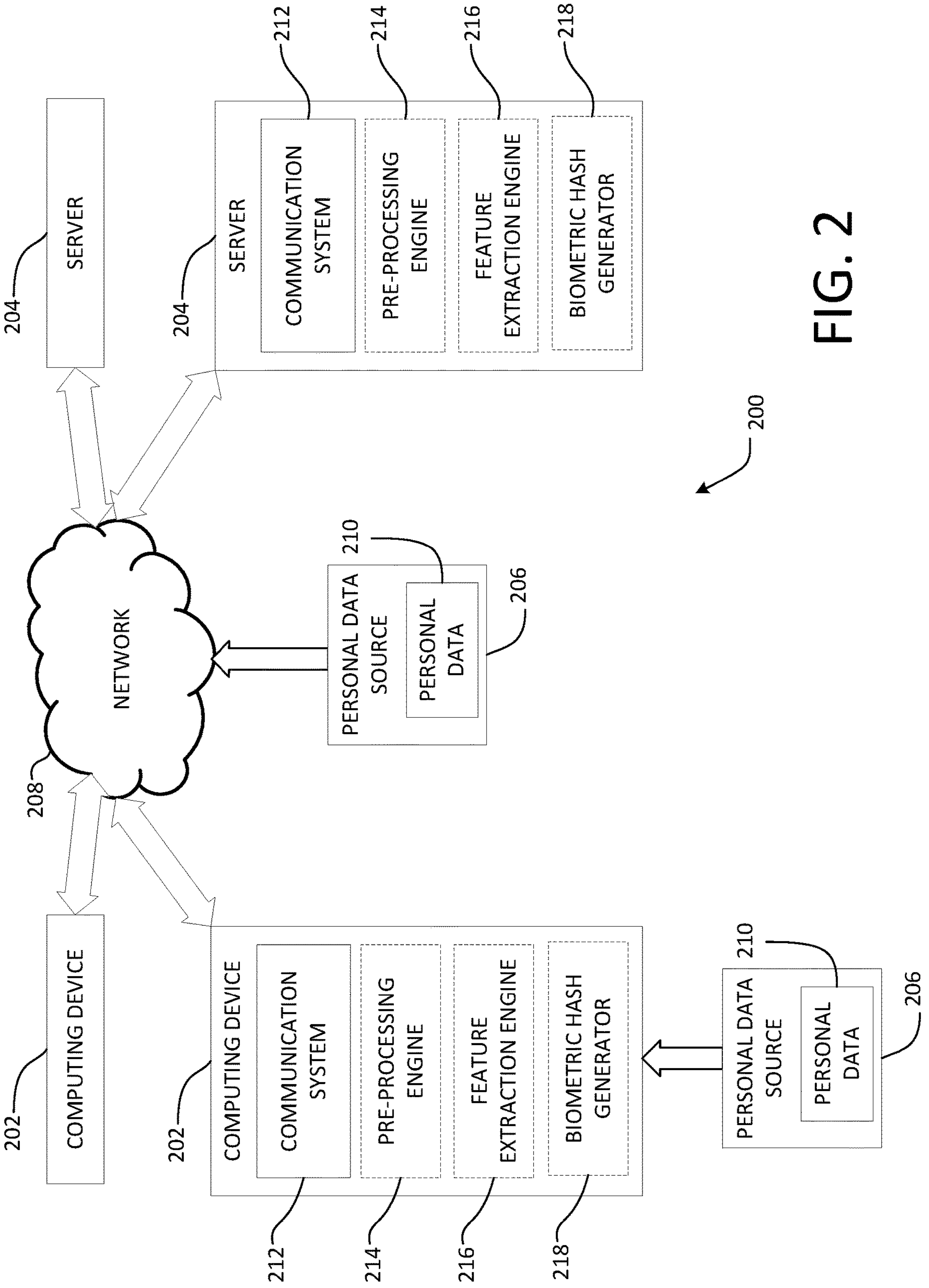
FIG. 2 illustrates an example system for generating a biometric hash according to some aspects described herein.

FIG. 2 shows an example of a system 200, in accordance with some aspects of the disclosed subject matter. The system 200 may be a system for generating a reliable biometric hash. The system 200 includes one or more computing devices 202, one or more servers 204, a personal data source 206, and a communication network or network 208. The computing device 202 can receive personal data 210 from the personal data source 206, which may be, for example, a person that provides personal data, a service that aggregates or otherwise receives personal data, a computer-executed program that generates personal data, and/or memory with data stored therein corresponding to personal data. The personal data 210 may include images, videos, and/or biometric data. For example, the personal data may include one or more images of a user's face. The personal data 210 may include additional and/or alternative types of personal data that may be recognized by those of ordinary skill in the art.

Additionally, or alternatively, the network 208 can receive personal data 210 from the personal data source 206, which may be, for example, a person that provides personal data, a service that aggregates or otherwise receives personal data, a computer-executed program that generates personal data, and/or memory with data stored therein corresponding to personal data. The personal data 210 may include images, videos, and/or biometric data. For example, the personal data may include one or more images of a user's face. The personal data 210 may include additional and/or alternative types of personal data that may be recognized by those of ordinary skill in the art.

Computing device 202 may include a communication system 212, a pre-processing engine or component 214, a feature extraction engine or component 216, and/or a biometric hash generator or component 218. In some examples, computing device 202 can execute at least a portion of the pre-processing component 214 to perform resolution control on received personal data (e.g., on an image of a user's face), perform face detection, perform localization, perform landmark estimation, perform a quality check, perform pose estimation and shot finding, perform a liveness check, perform alignment, and/or perform augmentation. Further, in some examples, computing device 202 can execute at least a portion of the feature extraction component 216 to extract features from personal data (e.g., an image of a user's face, such as that has been pre-processed by the pre-processing component 214). Further, in some examples, computing device 202 can execute at least a portion of the biometric hash generator 218 to generate a biometric hash, such as based on the features extracted via the feature extraction component 216.

Server 204 may include a communication system 212, a pre-processing engine or component 214, a feature extraction engine or component 216, and/or a biometric hash generator or component 218. In some examples, server 204 can execute at least a portion of the pre-processing component 214 to perform resolution control on received personal data (e.g., on an image of a user's face), perform face detection, perform localization, perform landmark estimation, perform a quality check, perform pose estimation and shot finding, perform a liveness check, perform alignment, and/or perform augmentation. Further, in some examples, server 204 can execute at least a portion of the feature extraction component 216 to extract features from personal data (e.g., an image of a user's face, such as that has been pre-processed by the pre-processing component 214). Further, in some examples, server 204 can execute at least a portion of the biometric hash generator 218 to generate a biometric hash, such as based on the features extracted via the feature extraction component 216.

Additionally, or alternatively, in some examples, computing device 202 can communicate data received from personal data source 206 to the server 204 over communication network 208, which can execute at least a portion of pre-processing component 214, feature extraction component 216, and/or biometric hash generator 218. In some examples, pre-processing component 214 may execute one or more portions of methods/processes 100 and/or 400 herein in connection with FIGS. 1 and 4, respectively. Further, in some examples, feature extraction component 216 may execute one or more portions of methods/processes 100 and/or 400 described herein in connection with FIGS. 1 and 4, respectively. Further, in some examples, biometric hash generator 218 may execute one or more portions of methods/processes 100 and/or 400 described herein connection with FIGS. 1 and 4, respectively.

In some examples, a plurality of the processes 102-118 of FIG. 1 (e.g., processes 102-116, processes 104-116, all of the processes 102-118) may be performed on the same computing device 202 or the same server 204, such as to reduce transmissions between devices (e.g., computing device 202 and server 204), and increase security of the overall system 200 for the received personal data 210.

In some examples, computing device 202 and/or server 204 can be any suitable computing device or combination of devices that may be used by a requestor, such as a desktop computer, a mobile computing device (e.g., a laptop computer, a smartphone, a tablet computer, a wearable computer, etc.), a server computer, a virtual machine being executed by a physical computing device, a web server, etc. Further, in some examples, there may be a plurality of computing devices 202 and/or a plurality of servers 204.

In some examples, personal data source 206 can be any suitable source of personal data (e.g., an image, video, biometric data, etc.), such as an image sensor (e.g., still camera, video camera, etc.). In a more particular example, personal data source 206 can include memory storing personal data (e.g., local memory of computing device 202, local memory of server 204, cloud storage, portable memory connected to computing device 202, portable memory connected to server 204, etc.).

In another more particular example, personal data source 206 can include an application configured to generate personal data. In some examples, personal data source 206 can be local to computing device 202. Additionally, or alternatively, personal data source 206 can be remote from computing device 202 and can communicate personal data 210 to computing device 202 (and/or server 204) via a communication network (e.g., communication network 208).

In some examples, communication network 208 can be any suitable communication network or combination of communication networks. For example, communication network 208 can include a Wi-Fi network (which can include one or more wireless routers, one or more switches, etc.), a peer-to-peer network (e.g., a Bluetooth network), a cellular network (e.g., a 3G network, a 4G network, a 5G network, etc., complying with any suitable standard), a wired network, etc. In some examples, communication network 208 can be a local area network (LAN), a wide area network (WAN), a public network (e.g., the Internet), a private or semi-private network (e.g., a corporate or university intranet), any other suitable type of network, or any suitable combination of networks. Communication links (arrows) shown in FIG. 2 can each be any suitable communications link or combination of communication links, such as wired links, fiber optics links, Wi-Fi links, Bluetooth links, cellular links, etc.

FIGS. 3A-3D illustrates an example user-interface (UI) 300, for generating a biometric hash. The UI 300 is merely an example. However, the example user-interface 300 is a graphical user-interface (GUI). In some examples, the GUI 300 is displayed on a screen, such as a screen of computing device 202 of FIG. 2.

The GUI 300 is an animated GUI and certain frames of the animation are illustrated in each of FIGS. 3A-3D. It should be recognized that the frames within FIGS. 3A-3D illustrate instances in the animation of the GUI 300 which may include processes or periods therebetween. The processes or periods therebetween, while not explicitly shown, should be recognized by those of ordinary skill in the art.

The GUI 300 shows feedback and/or user guidance according to some aspects described herein. Referring to FIG. 3A, a first frame 302, a second frame 304, a third frame 306, and a fourth frame 308 are shown. Referring to FIG. 3B, a fifth frame 312, a sixth frame 314, a seventh frame 316, and an eighth frame 318 are shown. Referring to FIG. 3C, a ninth frame 322, a tenth frame 324, an eleventh frame 326, and a twelfth frame 328 are shown. Referring to FIG. 3D, a thirteenth frame 332, a fourteenth frame 334, a fifteenth frame 336, and a sixteenth frame 338 are shown.

In some examples, the GUI 300 (e.g., frames 302-338) include one or more prompts 350. The prompt 350 may include text that is displayed to a user. In some examples, the text is an instruction to a user, such that the user moves to a specific pose. In some examples, the prompt 350 enables improved image resolution, improved facial detection, confirmed liveness, and/or other benefits, such as by instructing users to perform actions that enable such improvements/confirmations.

For example, the prompt 350 may include "Look straight at the camera!" (e.g., as shown in FIGS. 3A and 3B). In some examples, the prompt 350 includes "Your face is out of the frame!" (as shown in frame 312 of FIG. 3B). In some examples, the prompt 350 includes "Face is too small, get closer!" (as shown in frame 314 of FIG. 3B). In some examples, the prompt 350 includes "Turn your head left!" or "Turn your head right!" (as shown in FIG. 3C). In some examples, the prompt 350 incudes "Turn your head up!" or "Turn your head down!" (as shown in FIG. 3D). Additional and/or alternative examples of the prompt 350 should be recognized by those of ordinary skill in the art.

In some examples, the GUI 300 may be generated as part of one or more processes of the processes 102-118 of FIG. 1. For example, the GUI 300 may be generated and/or displayed as part of pose estimation and/or shot finding performed via process 110. As another example, the GUI may be generated and/or displayed as part of the resolution control of process 104, the detection, localization, and/or landmark estimation of process 106, the quality check of process 108, the liveness check of process 112, and/or the face alignment/augmentation of process 114.

In some examples, the GUI 300 includes a bounding or boundary shape 352. In some examples, the GUI 300 includes a virtual shape 354. Further, in some examples, the GUI 300 includes a face 356. In some examples, the bounding shape 352 and virtual shape 354 surround (e.g., entirely, or partially) the face 356. In some examples, the face 356 is a user's face, such as received via an image sensor. Alternatively, in some examples, the face 356 is an avatar face, which mirrors an orientation and/or configuration of a user's face.

In some examples, the center of a user's face (e.g., as represented by the face 356) is estimated, such as using one or more face landmarks. In some examples, the one or more face landmarks used for estimation may be the circumcenter of eyes and the center of a mouth, as illustrated on the face 356 in FIG. 3A. Based on the selected landmarks, the estimated center of the face 356 may be offset by a percentage of a size of the bounding shape 352, so that the estimated center of the face 356 and the center of the bounding shape 352 are aligned when an end user is looking straight at the camera (e.g., pitch and yaw=0). From this point on, a vertical shift between the two centers may be an estimation of pitch, and a horizontal shift may be an estimation of yaw. In some examples, roll may be estimated using two face landmarks (e.g., eye landmarks), such as of the face 356, which are expected to be horizontally aligned. In some examples, the two face landmarks can be calculated using basic geometry (e.g., calculating a vertical shift between two landmarks in degrees).

In some examples, the bounding shape 352 and the estimated center of the face 356 can be used by a shot finder to give feedback to the user regarding their current pose and guide them to a target pose. In some examples, the guiding of a user can be achieved in a variety of ways, such as using audio and/or visual indications. For example, referring to FIG. 3A, the GUI 300 includes a first or hollow shape 360 and a second or filled shape 362. In some examples, the hollow shape 360 is placed on the top of the bounding shape 352 and offset by a percentage of the bounding shape size. In some examples, The filled shape 362 is placed on the virtual shape 354, such as centered at the estimated center of the face 356 and scaled to a radius equal to the distance between the center of the bounding shape 352 and the hollow shape 360. In some examples, the virtual shape 354, thus the filled shape 362, is rotated using the estimated roll. In some examples, a prompt or call to action is provided to the user (e.g., via displayed text, displayed icons, emitted audio, etc.), such that the user is prompted to orient themselves, such that the filled shape 362 overlays the hollow shape 360 (e.g., achieving a yaw, pitch, and roll of zero or close to it). In some examples, a tolerance for hitting the exact target pose can also be controlled. For example, the frame 308 of FIG. 3A illustrates one example of adjusting tolerance by increasing the size of the hollow shape 360.

Additional and/or alternative ways to increase the tolerance should be recognized by those of ordinary skill in the art.

Referring to FIG. 3B, frame 312 illustrates an instance in which a user's face is out of frame. Accordingly, feedback may be provided (e.g., via the prompt 350 and/or changing the color and/or line style of the bounding shape 352) to prompt a user to take corrective action (e.g., by repositioning a camera or themselves, providing a different image, etc.). Frame 314 of FIG. 3B illustrates an instance of a faraway face where face resolution is too low. Accordingly, feedback may be provided (e.g., via the prompt 350 and/or changing the color and/or line style of the bounding shape 352) to prompt a user to take corrective action (e.g., by moving closer to a camera, providing a different image, etc.).

In some examples, the bounding shape 352 may include any of a variety of different shapes, colors, line styles, text formats, icons, and/or other indications that may be recognized by those of ordinary skill in the art. In some examples, the virtual shape 354 may include any of a variety of different shapes, colors, line styles, text formats, icons, and/or other indications that may be recognized by those of ordinary skill in the art. In some examples, the hollow shape 360 and/or the filled shape 362 may include any of a variety of different shapes, colors, line styles, text formats, icons, and/or other indications that may be recognized by those of ordinary skill in the art.

In some examples, techniques provided herein to capture a straight shot image may be repeated to capture several straight shot images (e.g., with some level of variance), and/or may be used to capture other target shots. FIG. 3C illustrates capturing left and right shots, and FIG. 3D illustrates capturing up and down shots. In some examples, to capture a left shot, the hollow shape 360 for target pose is placed on the left side of the bounding shape 352, such as in the same way the filled shape 362 for a current pose is placed on the left side of the virtual shape 354 (line hidden), but this time the center of the virtual shape 354 is offset to the right by a predefined percentage of the bounding shape size, so that the end user needs to turn left (e.g., by a predefined degree of yaw or close to it, while keeping a pitch of zero or close to it) to align the center of the virtual shape 354 with the center of the bounding shape 352, thereby aligning the virtual shape 354 and bounding shape 352. Furthermore, the end user may align their face horizontally (e.g., to a roll of zero or close to it), so that the filled shape 362 overlays the hollow shape 360, thereby achieving the target pose. Similar technique can be used to capture any pose, by using a different combination of virtual shape 354 offsetting, hollow shape 360 positioning, and/or filled shape 362 positioning.

Generally, the GUI 300 of FIGS. 3A-3D provides user-friendly and effective techniques for performing one or more aspects of the process 100 of FIG. 1, such as detection, localization, and/or landmark estimation, pose estimation and/or shot finding, resolution control, quality check, liveness check, face alignment, and/or face augmentation.

Figure 4:
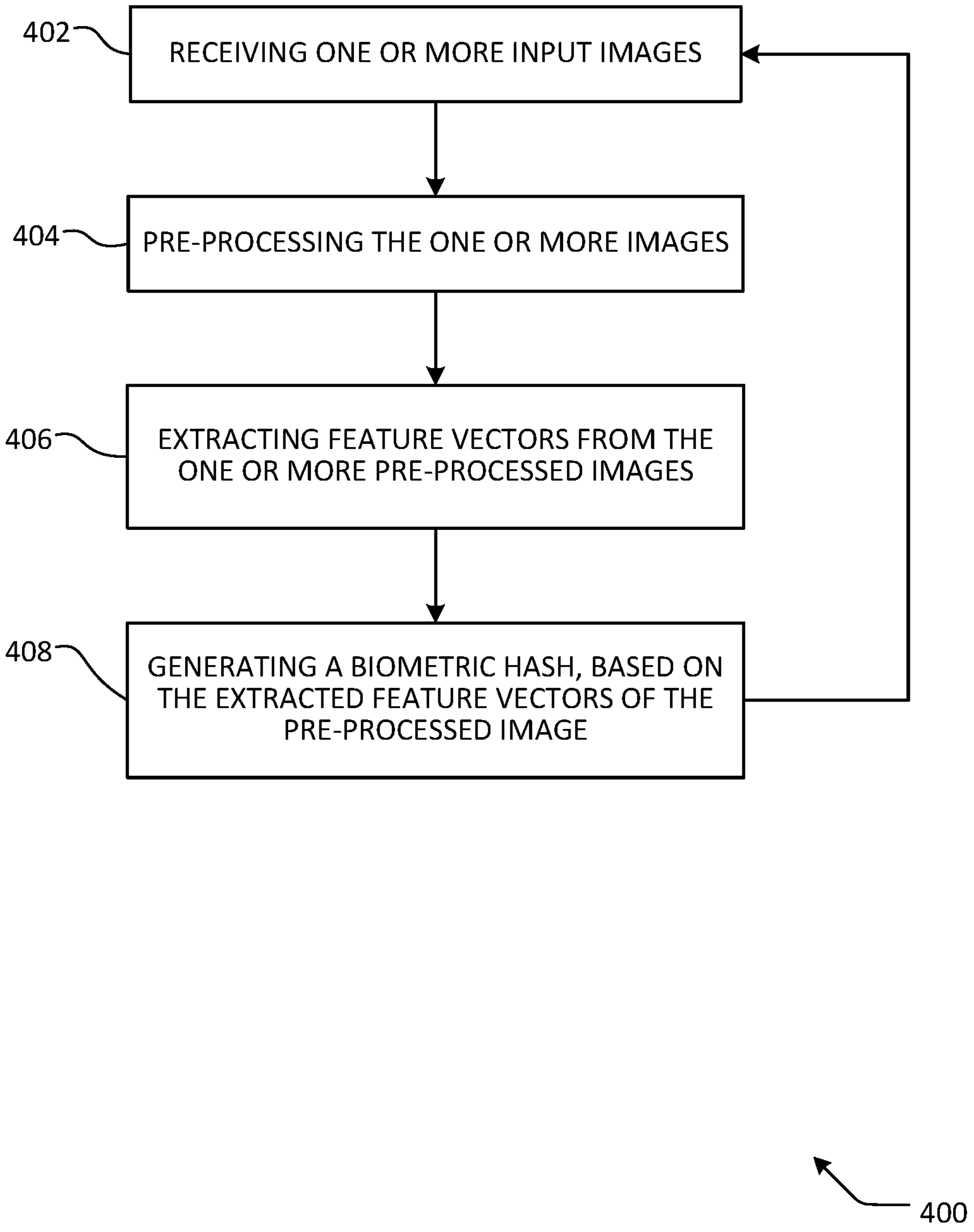
FIG. 4 illustrates an example method of generating a reliable biometric hash according to some aspects described herein.

FIG. 4 illustrates an example method 400 for generating a reliable biometric hash. In examples, aspects of method 400 are performed by a device, such as computing device 202 and/or server 204, discussed above with respect to FIG. 2. One or more aspects of method 400 may be the same or similar as aspects discussed earlier herein with respect to flow 100, system 200, and/or user-interface 300 of FIGS. 1, 2, and 3, respectively.

Method 400 begins at operation 402, where one or more input images are received. Aspects of operation 402 may be similar or the same as aspects of process 102 of flow 100 (see FIG. 1). In some examples, the one or more input images are a plurality of images. In some examples, the images are input (e.g., by a user or device). In some examples, the images are obtained, such as by a device that is configured to extract the image from one or more memories of one or more computing devices. In some examples, the input images include a selfie (e.g., an image of a user's face). In some examples, the input images are received from image sensors, such as a camera. In some examples, the image sensor is part of, or otherwise in communication with, a computing device (e.g., a mobile front/rear camera, a webcam, etc.).

At operation 404, the one or more images are pre-processed. Aspects of operation 404 may be similar or the same as aspects of processes 104-114 of flow 100 (see FIG. 1). For example, the pre-processing may include performing a resolution control, face detection, localization, landmark estimation, quality check, pose estimation, shot finding, liveness check, face alignment, and/or augmentation. It should be recognized that the aforementioned pre-processing techniques may be used in any of a variety of combinations or order, which should be recognized by those of ordinary skill in the art. Further, in some examples, one or more of the pre-processing techniques may be performed in parallel.

In some examples, the pre-processing includes generating a graphical user-interface (GUI), such as the GUI 300 described with respect to FIGS. 3A-3D. The GUI may include a prompt that instructs a user to take a corrective action (e.g., moving closer to a camera, adjusting their position within a frame, adjusting environment lighting, removing an obstruction, etc.). Examples of corrective actions which may be instructed or otherwise understood from instructions should be recognized by those of ordinary skill in the art, at least in light of the teachings provided herein.

In some examples, the GUI includes a face, a boundary shape, and a virtual shape (e.g., the face 356, boundary shape 352, and virtual shape 354 of FIGS. 3A-3D). The boundary and virtual shape may surround the face (e.g., completely or partially). Additional and/or alternative aspects of the GUI may be recognized by those of ordinary skill in the art, such as in light of the illustrations and corresponding descriptions of FIGS. 3A-3D.

At operation 406, feature vectors are extracted from the one or more pre-processed images. In some examples, the feature vectors are extracted using a machine-learning model. In some examples, mechanisms provided herein use a 1:N machine learning classifier to generate feature vector(s) from aligned (and/or augmented) face image(s). In some examples, the model used for feature extraction may be trained to map facial images into a multidimensional space where the distances between points (e.g., representing face images) correspond to the dissimilarity between the faces. In some examples, the feature extraction model learns a mapping function directly from raw or scaled (e.g., normalized, standardized, etc.) pixel values to a compact and continuous feature space.

In some examples, the feature extraction model may be trained using a triplet loss function, where, given an anchor image, a positive image (an image of the same person), and a negative image (an image of a different person), the model is trained to minimize the distance between the anchor and positive images while maximizing the distance between the anchor and negative images. This enforces the model to map similar faces closer together in the feature space and dissimilar faces further apart. In some examples, the feature extraction model may be trained using a classification-based loss function with a margin, to ensure that the learned features are not just separable, but discriminative as well.

At operation 408, a biometric hash is generated based on the extracted feature vector(s) of the pre-processed image(s). In some examples, the biometric hash is generated using a mirror hash model. In some examples, the mirror hash model includes, on enrollment of the pre-processed image(s), consolidating (e.g., averaging) enrollment feature vectors, if there are more than one, to get one enrollment feature vector, finding mirroring hyperplanes corresponding to the enrollment feature vectors and/or input feature vectors, and conducting an entropy test, on the level of the mirroring hyperplanes and/or the biometric hash, thereby verifying that an entropy of the mirroring hyperplanes and/or the biometric hash is sufficient. In some examples, operation 408 includes determining, based on the entropy test, whether to remove one or more hyperplanes from the mirroring hyperplanes. In some examples, operation 408 includes determining, based on the entropy test, whether to generate one or more hyperplanes to add to the mirroring hyperplanes. Therefore, in some examples, if necessary, hyperplane(s) may be removed from a set of all of the found mirroring hyperplanes and/or new hyperplane(s) generated accordingly, and generating the biometric hash, based on the mirroring hyperplanes. In some examples, the enrollment feature vector(s) are discarded (e.g., removed from any/all memory storages) and/or the input feature vectors are discarded (e.g., removed from any/all memory storages of the enrollment device) after the biometric hash is generated.

In some examples, the biometric hash is generated using a kernel hash model. In some examples, the kernel hash model includes generating a pairwise distance matrix between one or more pairs of the input feature vectors, determining a subset of the input feature vectors, based on the pairwise distance matrix, by applying a heuristic to the pairwise distance matrix, training a support vector machine model, using the subset of the input feature vectors, such that the parameters of the trained support vector machine model represent one or more hyperplanes in kernel space, and generating the biometric hash, based on the parameters of the trained support vector machine models.

In some examples, the heuristic includes drawing a first feature vector from the input feature vectors and assigning the feature vector a positive label. In some examples, the heuristic further includes using the pairwise distance matrix to find a second feature vector that is farthest away from the first feature vector in a kernel space and assigning the second feature vector a negative label. Further, in some examples, the heuristic includes finding $(n-2)/2$ samples that are closest to the first feature vector and $(n-2)/2$ samples that are closest to the second feature vector, based on the pairwise distance matrix, where n is the total number of samples in a selected subset of the input feature vectors. In some examples, the input feature vectors are discarded (i.e., removed from any/all memory storages) after the support vector machine models are trained. In some examples, the enrollment feature vector(s) are discarded (e.g., removed from any/all memory storages) after the biometric hash is generated.

In some examples, the biometric hash is generated using an entropy hash model. In some examples, the entropy hash model tries to achieve maximum entropy in the system to maximize security and privacy. In some examples, the entropy hash model extracts a random subset of subjects from the input pool. In some examples, a relatively larger subset group (e.g., training set size) provides relatively better security and privacy of a system than a relatively smaller subset group. As a result, a different sized subset groups can provide different true positive rates/false positive rates. In some examples, the entropy hash model simplifies processing into a binary classification problem. In some examples, the entropy hash model choose a target subject and gives it a random label. In some examples, the entropy hash model splits all of the subject's labels randomly for learning to classify into two equal groups; namely, the target subject's labels and non-target subject's labels, thus creating the most entropy in this system. In some examples, the entropy hash model chooses a number of classifiers k to train the data, based on different random labels and different random subsets of subjects. In some examples, the classifiers k can be linear (linear Support Vector Machine in its primal form protects against data leakage). In some examples, the classifier k can be nonlinear. In some examples, the entropy hash model can add more randomness to data by projecting to a higher dimension, thereby improving security and privacy and giving a different true positive rate/false positive rate.

In some examples, on inference, the entropy hash model takes a target subject as input and predicts on which side of a hyperplane the target subject exists, for each of the k classifiers, to get a hash of length k. In some examples, the entropy hash model can increase variance by adding more samples of each subject to an input pool N (and to the training set n) for a different true positive rate/false positive rate.

In some examples, one or more synthetic features vectors are added to the extracted feature vectors (e.g., included in a set of the enrollment feature vectors). For example, feature vectors can be synthesized by adding noise to existing feature vectors to get synthetic feature vectors that are θ degrees away, or m Euclidean distance away (θ and m are sampled from inter-class angle/distance distribution of the feature extractor). In some examples, feature vectors can be synthesized by generating them using a generative neural network model (e.g., GAN). In some examples, feature vectors can be synthesized by sampling them from a probability distribution (e.g., Gaussian Mixture Models).

Additional and/or alternative operations which may be included in the method 400 should be recognized by those of ordinary skill in the art, at least in light of the teachings provided herein with respect to the flow 100 of FIG. 1, the system 200 of FIG. 2, and the user-interface 300 of FIG. 3.

Method 400 may terminate at operation 408. Alternatively, method 400 may return to operation 402 (or any other operation from method 400) to provide an iterative loop, such as receiving one or more input images and generating a biometric hash for a user corresponding to the input images.

Some examples provided herein include techniques to evaluate each biometric hash model based on various requirements, such as accuracy, runtime and datasets used for evaluation. These evaluations allow for further optimization of the different models, such as by choosing the best bits created by the hashing models after they pass a test benchmark.

In some examples, testing the biometric hashes includes comparing biometric hash models in two scenarios: (1) images with no preprocessing involved, and (2) images with preprocessing using some processes of the flow 100 described in FIG. 1, such as controlling input/face image(s) resolution, face detection confidence score, face pose, quality factors (such as, illumination condition and blurriness), and/or face alignment.

In some examples, testing the biometric hash models provided herein includes creating a large enough dataset to be indicative of some trend that cannot be explained purely by randomness. For example, the dataset may include 100 subjects, where each subject has different variations (e.g., more than 300 samples on average without preprocessing involved) for true positive match cases. In some examples, that dataset includes 1000 different subjects with one variation for the false positive match cases.

In some testing examples, five subject variations may be used for enrollment and the rest may be used for the testing of the true positive match for each model. In some examples, for the true positive matches there are less samples used for testing in the second scenario due to controlling. In some examples, for the false positive match testing there are 1000 samples for both scenarios. In some examples, biometric hash models are measured based on area under an ROC curve (AUC), which those of ordinary skill in the art should recognize as a common metric for evaluation of binary classification. In some examples, since models provided herein may have more than one classifier/hyperplane, an average AUC may be used over all classifiers/hyperplanes.

In some examples, comparing scenario (1) to scenario (2), using the average AUC of the biometric hash models provided herein, shows an increase. For example, for a 16-bit Kernel Hash model, the model's average AUC may go up from 0.741 to 0.942 due to preprocessing steps described herein. Further, in some examples, for a 1024-bit mirror hash, the model's average AUC went from 0.856 to 0.992 due to preprocessing steps described herein. These results demonstrate a clear advantage to using the methods provided herein for generating a reliable biometric hash.

In some examples, biometric hash applications can be classified into multiple categories based on how the biometric hash and model parameters are handled. For example, one category includes generating and processing, in which nothing is stored, such that unlinkability and irreversibility are less of a concern, while uniqueness and repeatability remain beneficial. The use of a biometric hash model that utilizes an underlying feature extractor for this application may be feasible if the model enhances the performance of its underlying feature extractor. For example, mechanisms provided herein may be beneficial for face match (1:1) where two input images are given (e.g., a selfie and ID portrait image for a transaction).

Another example category includes generating and seeding, in which model parameters are stored in a secure or encrypted storage (when applicable) on end user device, while the biometric hash is used to seed a pseudorandom number generator (PRNG) used in a deterministic cryptographic scheme (e.g., public/private key generation), which can conceal the biometric hash and prevents its combination with the model parameters. Therefore, the biometric hash may be sufficiently random and long (e.g., unlinkable and irreversible) to ensure that the cryptographic process stays random and resilient to brute force attacks. In some examples, an additional salt may be added to the biometric hash and securely stored. In some examples, a public key is known to everyone, such that the security of the generated public/private key against brute force attacks will be equivalent to that of the biometric hashing model in cases where model parameters, and the additional salt (if any), are compromised, which may weaken biometric hash privacy. For example, this category may include public/private key generation seeding, which eliminates the need to store the private keys, instead generating keys on the fly (e.g., in real-time) from an input image (e.g., using face-based authentication and digital certificates).

Another example category includes generate and store, in which model parameters are stored in a secure or encrypted storage (when applicable) on a server side or end user device depending on the use case. For example, model parameters may be stored on end user device in case of authentication, while they are stored on server side in case of face verification and identification. In some examples, a cryptographic hash of a salted biometric hash is stored on the server side, which conceals the biometric hash and prevents it from being combined with the model parameters. Therefore, in some examples the biometric hash is sufficiently random and long (e.g., unlinkable and irreversible) to ensure that a cryptographic hash stays random and resilient to brute force attacks. In some examples, an additional salt can be added to the biometric hash and securely stored. Example use cases of this category may include authentication (e.g., password-like face-based authentication), face verification (1:1), and/or face identification (1:N) (e.g., face fraud detection like a face velocity monitor).

Figure 5:
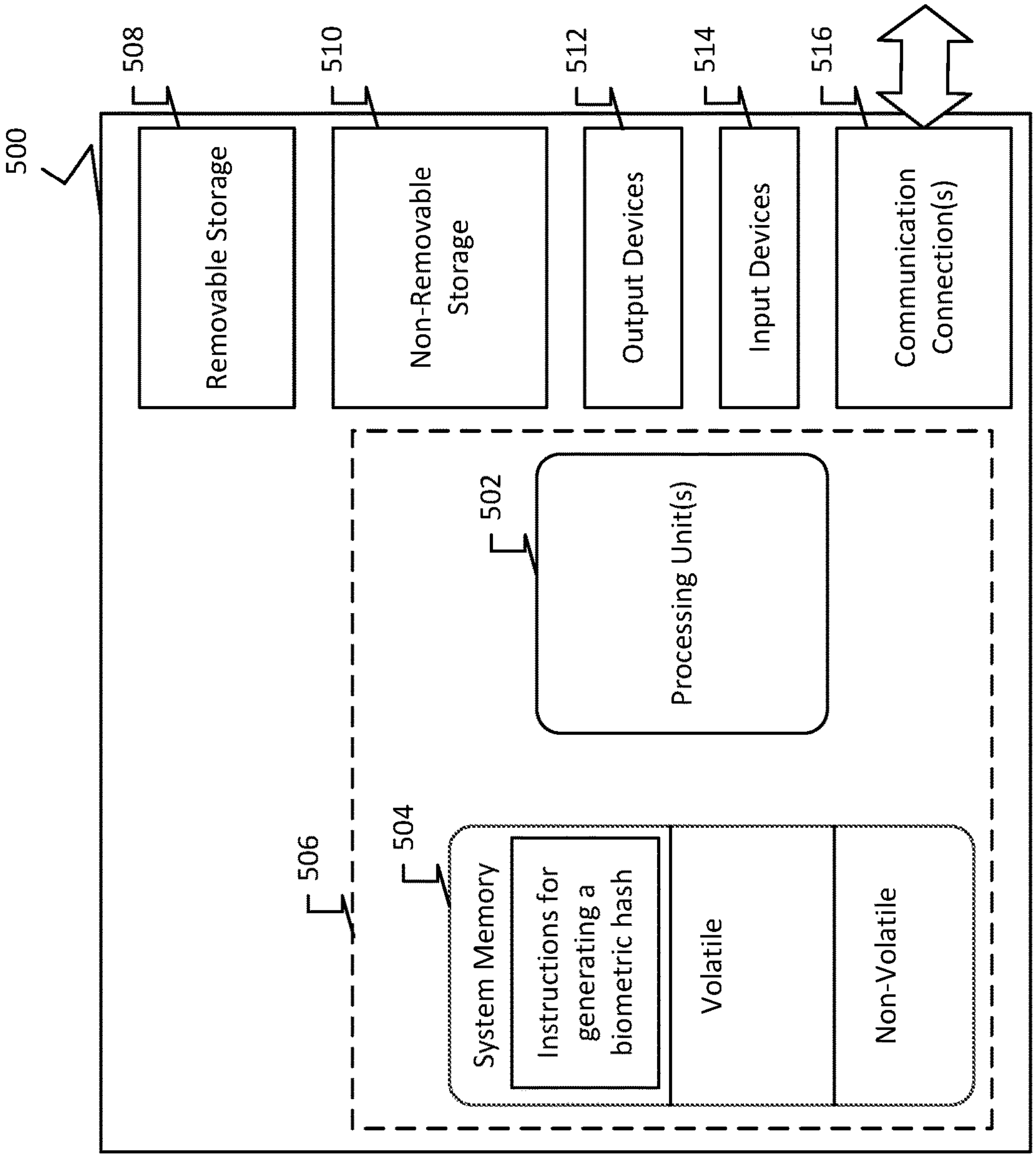
FIG. 5 illustrates a simplified block diagram of a device with which aspects of the present disclosure may be practiced in accordance with aspects of the present disclosure.

FIG. 5 and the associated descriptions provide a discussion of a variety of operating environments in which aspects of the disclosure may be practiced. However, the devices and systems illustrated and discussed with respect to FIG. 5 are for purposes of example and illustration and are not limiting of a vast number of computing device configurations that may be utilized for practicing aspects of the disclosure, described herein.

FIG. 5 illustrates a simplified block diagram of a device with which aspects of the present disclosure may be practiced in accordance with aspects of the present disclosure. The device may be a mobile computing device, for example. One or more of the present embodiments may be implemented in an operating environment 500. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smartphones, network PCs, minicomputers, mainframe computers, distributed computing environments that include any of the above systems or devices, and the like.

In its most basic configuration, the operating environment 500 typically includes at least one processing unit 502 and memory 504. Depending on the exact configuration and type of computing device, memory 504 (e.g., instructions for generating a biometric hash as disclosed herein, etc.) may be volatile (such as RAM), non-volatile (such as ROM, flash memory, etc.), or some combination of the two. This most basic configuration is illustrated in FIG. 5 by dashed line 506. Further, the operating environment 500 may also include storage devices (removable, 508, and/or non-removable, 510) including, but not limited to, magnetic or optical disks or tape. Similarly, the operating environment 500 may also have input device(s) 514 such as remote controller, keyboard, mouse, pen, voice input, on-board sensors, etc. and/or output device(s) 512 such as a display, speakers, printer, motors, etc. Also included in the environment may be one or more communication connections 516, such as LAN, WAN, a near-field communications network, a cellular broadband network, point to point, etc.

Operating environment 500 typically includes at least some form of computer readable media. Computer readable media can be any available media that can be accessed by the at least one processing unit 502 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, non-transitory medium which can be used to store the desired information. Computer storage media does not include communication media. Computer storage media does not include a carrier wave or other propagated or modulated data signal.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

The operating environment 500 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The present disclosure relates to systems and methods for anonymizing data. Any of the one or more examples provided herein may be used in combination with any other of the one or more examples provided herein.

In some examples, a method for generating a reliable biometric hash is provided. The method includes: receiving one or more input images; performing pre-processing on the one or more input images, the pre-processing including a face detection, landmark estimation, and liveness check; extracting one or more feature vectors from the one or more pre-processed images, via a machine-learning model; and generating a biometric hash, based on the one or more extracted feature vectors of the one or more pre-processed images.

In some examples, the biometric hash is generated using a mirror hash model. In some examples, the generating using a mirror hash model includes: on enrollment of the one or more pre-processed images, finding mirroring hyperplanes corresponding to each of the extracted feature vectors; conducting an entropy test, on the level of the mirroring hyperplanes and the biometric hash, thereby verifying that an entropy of the mirroring hyperplanes and the biometric hash is sufficient; determining, based on the entropy test, whether to remove one or more hyperplanes from the mirroring hyperplanes; and generating the biometric hash, based on the mirroring hyperplanes.

In some examples, the biometric hash is generated using a kernel hash model. In some examples, the generating using a kernel hash model includes: generating a pairwise distance matrix between one or more pairs of the extracted feature vectors; determining a subset of the extracted feature vectors, based on the pairwise distance matrix, by applying a heuristic to the pairwise distance matrix; training one or more support vector machine models, using the subset of the extracted feature vectors, such that the parameters of the one or more trained support vector machine models represent one or more hyperplanes in kernel space; and generating the biometric hash, based on the parameters of the one or more trained support vector machine models.

In some examples, the pre-processing further includes performing pose estimation and shot finding. In some examples, the pre-processing includes: generating a graphical user-interface (GUI) including a prompt, wherein the prompt instructs a user to take corrective action; displaying the GUI and the prompt; and receiving an updated image corresponding to the instructed corrective action. In some examples, the GUI comprises a face, a boundary shape, and a virtual shape. In some examples, the boundary and virtual shapes surround the face.

In some examples, a system for generating a reliable biometric hash is provided. In some examples, the system includes at least one processor; and memory storing instructions that, when executed by the at least one processor, causes the system to perform a set of operations. In some examples, the set of operations include: receiving one or more input images; performing pre-processing on the one or more input images, the pre-processing including a face detection, landmark estimation, and liveness check; extracting one or more feature vectors from the one or more pre-processed images, via a machine-learning model; and generating a biometric hash, based on the one or more extracted feature vectors of the one or more pre-processed images.

In some examples, the biometric hash is generated using a mirror hash model. In some examples, the generating using a mirror hash model includes: on enrollment of the one or more pre-processed images, finding mirroring hyperplanes corresponding to each of the extracted feature vectors; conducting an entropy test, on the level of the mirroring hyperplanes and the biometric hash, thereby verifying that an entropy of the mirroring hyperplanes and the biometric hash is sufficient; determining, based on the entropy test, whether to remove one or more hyperplanes from the mirroring hyperplanes; and generating the biometric hash, based on the mirroring hyperplanes.

In some examples, the biometric hash is generated using a kernel hash model. In some examples, the generating using a kernel hash model includes: generating a pairwise distance matrix between one or more pairs of the extracted feature vectors; determining a subset of the extracted feature vectors, based on the pairwise distance matrix, by applying a heuristic to the pairwise distance matrix; training one or more support vector machine models, using the subset of the extracted feature vectors, such that the parameters of the one or more trained support vector machine models represent one or more hyperplanes in kernel space; and generating the biometric hash, based on the parameters of the one or more trained support vector machine models.

In some examples, the pre-processing further includes performing pose estimation and shot finding. In some examples, the pre-processing includes: generating a graphical user-interface (GUI) including a prompt, wherein the prompt instructs a user to take corrective action; displaying the GUI and the prompt; and receiving an updated image corresponding to the instructed corrective action. In some examples, the GUI comprises a face, a boundary shape, and a virtual shape. In some examples, the boundary and virtual shapes surround the face.

In some examples, a method for generating a reliable biometric hash are provided. In some examples, the method includes: receiving one or more input images; performing pre-processing on the one or more input images, the pre-processing including a landmark estimation and liveness check; extracting feature vectors from the one or more pre-processed images, via a machine-learning model; and generating a biometric hash using a kernel hash model, based on the extracted feature vectors of the one or more pre-processed images, the generating a biometric hash using a kernel hash model includes: generating a pairwise distance matrix between one or more pairs of the extracted feature vectors; determining a subset of the extracted feature vectors, based on the pairwise distance matrix, by applying a heuristic to the pairwise distance matrix; training a support vector machine model, using the subset of the extracted feature vectors, such that the parameters of the trained support vector machine model represent one or more hyperplanes in kernel space; and generating the biometric hash, based on the parameters of the trained support vector machine model.

In some examples, the heuristic includes: drawing a first feature vector from the extracted feature vectors and assigning the feature vector a positive label; using the pairwise distance matrix, find a second feature vector that is farthest away from the first feature vector in a kernel space and assign the second feature vector a negative label; and finding $(n-2)/2$ samples that are closest to the first feature vector and $(n-2)/2$ samples that are closest to the second feature vector, based on the pairwise distance matrix, wherein n is the total number of extracted feature vectors. In some examples, bit grouping is applied to the generated biometric hash. In some examples, one or more synthetic feature vectors are added to the extracted feature vectors.

The description and illustration of one or more aspects provided in this application are not intended to limit or restrict the scope of the disclosure as claimed in any way. The aspects, examples, and details provided in this application are considered sufficient to convey possession and enable others to make and use claimed aspects of the disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method for generating a reliable biometric hash, the method comprising:

receiving one or more input images;

performing pre-processing on the one or more input images, the pre-processing including a face detection, landmark estimation, and liveness check;

extracting one or more feature vectors from the one or more pre-processed images, via a machine-learning model; and generating, based on one or more hyperplanes generated by transforming the one or more extracted feature vectors of the one or more pre-processed images, a biometric hash, wherein the one or more hyperplanes hide the one or more extracted feature vectors of the one or more pre-processed images and prevent the biometric hash from exposing the biometric data.

2. The method of claim 1, wherein the biometric hash is generated using a mirror hash model.

3. The method of claim 2, wherein the generating using a mirror hash model comprises:

on enrollment of the one or more pre-processed images, finding one or more hyperplanes corresponding to each of the extracted feature vectors, wherein the one or more hyperplanes represent one or more mirroring hyperplanes;

conducting an entropy test, on the level of the one or more mirroring hyperplanes and the biometric hash, thereby verifying that an entropy of the one or more mirroring hyperplanes and the biometric hash is sufficient;

determining, based on the entropy test, whether to remove at least a part of the one or more mirroring hyperplanes from the one or more mirroring hyperplanes; and generating the biometric hash, based on the one or more mirroring hyperplanes excluding the removed at least the part of the one or more mirroring hyperplanes.

4. The method of claim 1, wherein the biometric hash is generated using a kernel hash model.

5. The method of claim 4, wherein the generating using a kernel hash model comprises:

generating a pairwise distance matrix between one or more pairs of the extracted feature vectors;

determining a subset of the extracted feature vectors, based on the pairwise distance matrix, by applying a heuristic to the pairwise distance matrix;

training one or more support vector machine models, using the subset of the extracted feature vectors, such that the parameters of the one or more trained support vector machine models represent the one or more hyperplanes in kernel space; and generating the biometric hash, based on the parameters of the one or more trained support vector machine models.

6. The method of claim 1, wherein the pre-processing further includes performing pose estimation and shot finding.

7. The method of claim 6, wherein the pre-processing includes:

generating a graphical user-interface (GUI) comprising a prompt, wherein the prompt instructs a user to take corrective action;

displaying the GUI and the prompt; and receiving an updated image corresponding to the instructed corrective action.

8. The method of claim 7, wherein the GUI comprises a face, a boundary shape, and a virtual shape, the boundary and virtual shapes surrounding the face.

9. A system for generating a reliable biometric hash, the system comprising:
at least one processor; and
memory storing instructions that, when executed by the at least one processor, cause the system to perform a set of operations, the set of operations comprising:
receiving one or more input images;
performing pre-processing on the one or more input images, the pre-processing including a face detection, landmark estimation, and liveness check;
extracting one or more feature vectors from the one or more pre-processed images, via a machine-learning model; and
generating, based on one or more hyperplanes generated by transforming the one or more extracted feature vectors of the one or more pre-processed images, a biometric hash,
wherein the one or more hyperplanes hide the one or more extracted feature vectors of the one or more pre-processed images and prevent the biometric hash from exposing the biometric data.

10. The system of claim 9, wherein the biometric hash is generated using a mirror hash model.

11. The system of claim 10, wherein the generating using a mirror hash model comprises:
on enrollment of the one or more pre-processed images, finding the one or more hyperplanes corresponding to each feature vector of the extracted feature vectors, wherein the one or more hyperplanes represent one or more mirroring hyperplanes;
conducting an entropy test, on the level of the one or more mirroring hyperplanes and the biometric hash, thereby verifying that an entropy of the one or more mirroring hyperplanes and the biometric hash is sufficient;
determining, based on the entropy test, whether to remove at least a part of the one or more mirroring hyperplanes from the one or more mirroring hyperplanes; and
generating the biometric hash, based on the one or more mirroring hyperplanes excluding the removed at least the part of the one or more mirroring hyperplanes.

12. The system of claim 9, wherein the biometric hash is generated using a kernel hash model.

13. The system of claim 12, wherein the generating using a kernel hash model comprises:
generating a pairwise distance matrix between one or more pairs of the extracted feature vectors;
determining a subset of the extracted feature vectors, based on the pairwise distance matrix, by applying a heuristic to the pairwise distance matrix;
training a support vector machine model, using the subset of the extracted feature vectors, such that the parameters of the trained support vector machine model represent the one or more hyperplanes in kernel space; and
generating the biometric hash, based on the parameters of the trained support vector machine models.

14. The system of claim 9, wherein the pre-processing further includes performing pose estimation and shot finding.

15. The system of claim 14, wherein the pre-processing includes:
generating a graphical user-interface (GUI) comprising a prompt, wherein the prompt instructs a user to take corrective action;
displaying the GUI and the prompt; and
receiving an updated image corresponding to the instructed corrective action.

16. The system of claim 15, wherein the GUI comprises a face, a boundary shape, and a virtual shape, the boundary and virtual shapes surrounding the face.

17. A method for generating a reliable biometric hash, the method comprising:
receiving one or more input images;
performing pre-processing on the one or more input images, the pre-processing including a landmark estimation and liveness check;
extracting feature vectors from the one or more pre-processed images, via a machine-learning model; and
generating a biometric hash using a kernel hash model, based on the extracted feature vectors of the one or more pre-processed images,
the generating a biometric hash using a kernel hash model comprising:
generating a pairwise distance matrix between one or more pairs of the extracted feature vectors;
determining a subset of the extracted feature vectors, based on the pairwise distance matrix, by applying a heuristic to the pairwise distance matrix;
training a support vector machine model, using the subset of the extracted feature vectors, such that the parameters of the trained support vector machine model represent one or more hyperplanes in kernel space; and
generating the biometric hash, based on the parameters of the trained support vector machine model.

18. The method of claim 17, wherein the heuristic comprises:
drawing a first feature vector from the extracted feature vectors and assigning the feature vector a positive label;
using the pairwise distance matrix, find a second feature vector that is farthest away from the first feature vector in a kernel space and assign the second feature vector a negative label; and
finding $(n-2)/2$ samples that are closest to the first feature vector and $(n-2)/2$ samples that are closest to the second feature vector, based on the pairwise distance matrix, wherein n is the total number of extracted feature vectors.

19. The method of claim 17, wherein bit grouping is applied to the generated biometric hash.

20. The method of claim 17, wherein one or more synthetic feature vectors are added to the extracted feature vectors.

* * * * *